United States Patent
Zhu et al.

(10) Patent No.: US 10,829,390 B2
(45) Date of Patent: Nov. 10, 2020

(54) MULTILAYER BODY, PREPARATION METHOD THEREFOR AND USE THEREOF

(71) Applicant: Nanjing University, Nanjing (CN)

(72) Inventors: Jia Zhu, Nanjing (CN); Xiuqiang Li, Nanjing (CN); Weichao Xu, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 0 days.

(21) Appl. No.: 16/092,432

(22) PCT Filed: Apr. 11, 2017

(86) PCT No.: PCT/CN2017/080055
§ 371 (c)(1),
(2) Date: Oct. 9, 2018

(87) PCT Pub. No.: WO2017/177891
PCT Pub. Date: Oct. 19, 2017

(65) Prior Publication Data
US 2019/0106335 A1    Apr. 11, 2019

(30) Foreign Application Priority Data
Apr. 11, 2016  (CN) .......................... 2016 1 0222559

(51) Int. Cl.
*C02F 1/14*   (2006.01)
*F24S 70/10*  (2018.01)
(Continued)

(52) U.S. Cl.
CPC .............. *C02F 1/14* (2013.01); *B01D 1/0035* (2013.01); *C02F 1/048* (2013.01); *F24S 70/10* (2018.05);
(Continued)

(58) Field of Classification Search
CPC .... C02F 1/04; C02F 1/043; C02F 1/14; C02F 1/28; C02F 1/288; F24S 10/80; F24S 70/10; F24S 80/65; F24S 2080/014
See application file for complete search history.

(56) References Cited

U.S. PATENT DOCUMENTS 4,182,308 A * 1/1980 Reynolds .............. F24S 10/503
126/640
4,243,021 A * 1/1981 Homsy ................. F24S 10/503
126/674
(Continued)

FOREIGN PATENT DOCUMENTS

CN          2389148        7/2000
CN       103030140 A       4/2013
(Continued)

OTHER PUBLICATIONS

Ghasemi, Hadi, et al., "Solar Steam Generation by Heat Localization," Nature Communications 5, Jul. 21, 2014, 7 pages, Article 4449, Macmillan Publishers Limited, New York City, USA.
European Search Report of commonly owned corresponding European Patent Application EP17781867, dated Oct. 8, 2019, 9 pages, International Searching Authority (EPO).

*Primary Examiner* — Renee Robinson
(74) *Attorney, Agent, or Firm* — Adeli LLP

(57) ABSTRACT

Disclosed is a multilayer body, comprising a base (2) and a carbon material layer (1) on the base (2), wherein the base (2) is water-permeable, and the carbon material comprises one or more of the following materials: graphite, graphene, graphene oxide, a chemical function group-modified graphene and carbon nanotubes. Further disclosed are a method for preparing the multilayer body, the use of the multilayer body, and a light-absorbing device containing the multilayer body.

21 Claims, 8 Drawing Sheets (a)

(b)

(51) Int. Cl.
  *F24S 10/80* (2018.01)
  *B01D 1/00* (2006.01)
  *C02F 1/04* (2006.01)
  *F24S 10/17* (2018.01)
  *F24S 80/00* (2018.01)
  *F24S 80/65* (2018.01)
  *C02F 103/08* (2006.01)

(52) U.S. Cl.
  CPC .... *C02F 2103/08* (2013.01); *C02F 2201/009* (2013.01); *F24S 10/17* (2018.05); *F24S 10/80* (2018.05); *F24S 80/65* (2018.05); *F24S 2080/013* (2018.05); *F24S 2080/014* (2018.05); *Y02A 20/212* (2018.01); *Y02W 10/37* (2015.05)

(56) References Cited

U.S. PATENT DOCUMENTS

| | | |
|---|---|---|
| 2012/0255899 A1 | 10/2012 | Choi et al. |
| 2015/0053607 A1 | 2/2015 | Liu et al. |
| 2015/0072133 A1 | 3/2015 | Ghasemi et al. |
| 2015/0226456 A1 | 8/2015 | Miles |
| 2017/0038097 A1* | 2/2017 | Ni ..................... F24S 80/525 |

FOREIGN PATENT DOCUMENTS

| | | |
|---|---|---|
| CN | 104415669 A | 3/2015 |
| CN | 106256768 A | 12/2016 |
| EP | 3444228 A1 | 2/2019 |

* cited by examiner

MULTILAYER BODY, PREPARATION METHOD THEREFOR AND USE THEREOF

TECHNICAL FIELD

The invention belongs to the field of light absorption, and particularly relates to a multilayer body as well as a preparation method and application thereof.

BACKGROUND

The shortage of fresh water resources has become one of the most urgent problems in modern age. It is an effective way to obtain fresh water resources by desalting seawater. The method for desalting seawater mainly comprises distillation methods, desalting by using membranes, crystallization methods, desalting by using a solvent to extract, ion exchange methods and the like. The method that desalting seawater by using solar energy has the advantages of being clean, green and low in carbon, which makes this method a promising solution for producing fresh water.

Since water has high reflectivity and transmissivity, when it is directly irradiated by sunlight, it cannot efficiently utilize solar energy and steam cannot be efficiently generated. In order to improve the efficiency of utilizing solar energy and to improve the efficiency of steam generation, people use material having a relatively high optical absorbance as a light absorption body to absorb light energy. The light energy absorbed by the absorption body is then transferred to the water body in a form of heat energy, and then the water is heated to generate steam.

In the prior art, nanoparticles have been used as light absorbers. In this method, nanoparticles are dispersed in water. When irritated by light, the nanoparticles can generate heat energy to heat the water. Thus, the water can be evaporated effectively.

In the prior art, porous materials have been used as light absorbers. In this method, porous materials with high optical absorbance are covered on the surface of water. When irritated by light, the porous materials can generate heat energy to heat the water. Accordingly, the water can be evaporated effectively.

BRIEF SUMMARY OF THE DISCLOSURE

The inventor has found that the light absorber adopted in the prior art has disadvantages including complicated preparation process and high cost, which make them unsuitable for large scale production and application.

For the first time, the inventors obtain a multilayer body by combing a carbon material layer (the carbon material may comprise one or more of the following: graphite, graphene, graphene oxide, graphene a chemical functional group and carbon nanotubes) with a water permeable base body. This multilayer body can be used as a light absorber to absorb light energy and to evaporate liquid. The multilayer body is easy to prepare and low in cost, which make it suitable for large scale production and application.

In some embodiments, the inventors have further improved the base body of the multilayer body. Base bodies which are water permeable and have relatively low thermal conductivity were produced. These multilayer bodies demonstrate a relatively high efficiency for generating water vapor and a relatively high transfer efficiency of solar energy.

One object of the disclosure is to provide a multilayer body. Another object of the disclosure is to provide a multilayer body capable of absorbing light energy for the use of evaporating liquid. Another object of the disclosure is to provide a preparation method of the multilayer body. Another object of the disclosure is to provide a usage (or using method) of a carbon material (the carbon material may comprise one or more of the following: graphite, graphene, graphene oxide, graphene modified by chemical functional groups and carbon nanotubes).

To achieve one or more of the objects mentioned above, in the first aspect, a multilayer body is provided. The multilayer body comprises a water permeable base body and a carbon material layer on the such base body, and the base body is water permeable;

the carbon material comprises one or more of the following: graphite, graphene, graphene oxide, graphene modified by chemical functional groups and carbon nanotubes.

In the second aspect, a preparation method of a multilayer body is provided. The preparation method comprises the following steps:

a) obtaining a liquid in which a carbon material is dispersed;

b) coating or depositing the on a water permeable base body that is water permeable;

the carbon material comprises one or more of the following: graphite, graphene, graphene oxide, graphene a chemical functional group and carbon nanotubes.

In the third aspect, a multilayer body is provided. The multilayer body is prepared by the preparation method of a multilayer body according to any embodiment of the disclosure.

In the fourth aspect, the use of a multilayer body according to the disclosure as a light absorber is provided.

In the fifth aspect, the use of a carbon material layer according to the discloser as a light absorber is provided.

The beneficial effects of the disclosure are as follows:

The multilayer body and/or the preparation method of the multilayer body according to the disclosure have one or more of the following advantages:

(1) The preparation method of the multilayer body is simple, convenient and of low cost;

(2) the multilayer body is highly hydrophilic;

(3) the multilayer body has good strength, especially good folding resistance which makes it is easy to transport and deploy;

(4) when used as a light absorber, the multilayer body is capable of producing steam in high efficiency;

(5) when used as a light absorber, the multilayer body is capable of has high solar energy utilization rate is high;

(6) when used as a light absorber, the multilayer body is capable of generating steam efficiently and/or utilizing solar energy sufficiently under light of low optical power density;

(7) the multilayer body is durable and stable in circulation performance;

(8) the multilayer body has good thermal insulation property and it has relatively low heat conductivity even when it is soaked with water;

(9) the multilayer body has a porous structure, which provides convenient channel for the multilayer body to absorb water and for the steam to escape;

(10) in one or more embodiments, the carbon material layer of the multilayer body has a convex surface, for example, such as a conical surface; when used for distilling liquid, the multilayer body is capable of utilizing solar energy sufficiently even in a small occupied area; when being used outdoors, the multilayer body is capable of receive receiving sunlight from different angles, that is i.e. the multilayer body is capable of absorbing higher amount per unit area, which results in high production efficiency of water vapor.

BRIEF DESCRIPTION OF THE DRAWINGS

The drawings described herein are used to provide further illustration of the disclosure, so they constitute a part of the disclosure. In the drawings:

FIG. 17 also includes graph (d) depicting plots illustrating the cumulative weight change of water-filled beakers provided by multilayer bodies 810, 820, and 830 as a function of time under outdoor sunlight;

DETAILED DESCRIPTION

Figure 1:
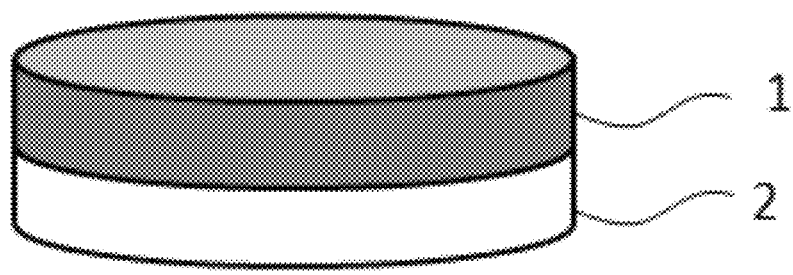
FIG. 1 is a graph depicting a schematic diagram of multilayer body-1.

The invention provides the following specific embodiments and all possible combinations of them. For the purposes of brevity, various specific combinations of embodiments are not described one by one, however, it should be recognized that all possible combinations of the embodiments are specifically described and disclosed by the disclosure.

In an embodiment, the disclosure provides a multilayer body comprising a base body and a carbon material layer disposed on the base body, wherein the base body is water permeable;

the carbon material comprises a substance selected from the group consisting of: graphite, graphene, graphene oxide, graphene a chemical functional group, carbon nanotubes and combinations thereof.

In an embodiment, the disclosure provides a multilayer body, wherein the carbon material comprises graphene oxide.

In an embodiment, the disclosure provides a multilayer body, wherein the carbon material layer comprises a graphene oxide layer.

In an embodiment, the disclosure provides a multilayer body, wherein the graphene oxide layer consists of a plurality of single-layer graphene oxide layers laminated to each other.

In an embodiment, the disclosure provides a multilayer body, wherein the carbon material layer and/or the base body are thermally insulating.

In an embodiment, the disclosure provides a multilayer body, wherein the multilayer body has a thermal conductivity of less than 1 W/(m·K) in at least a direction (such as the direction perpendicular to a layer face) when wetted with water, preferably less than 0.2 W/(m·K), and further preferably less than 0.1 W/(m·K).

In an embodiment, the disclosure provides a multilayer body, wherein the carbon material layer has a thermal conductivity of less than 1 W/(m·K) in at least one direction (such as the direction perpendicular to a layer face) when wetted with water, preferably less than 0.2 W/(m·K).

In an embodiment, the disclosure provides a multilayer body, wherein the base body has a thermal conductivity of less than 1 W/(m·K) in at least one direction. (such as the direction perpendicular to a layer face of the multilayer body) when wetted with water, preferably less than 0.2 W/(m·K), and preferably less than 0.1 W/(m·K)

In an embodiment, the disclosure provides a multilayer body, wherein the multilayer body is water permeable in at least one direction. (such as the direction perpendicular to a layer face)

In an embodiment, the disclosure provides a multilayer body, wherein when the multilayer body is placed on water, the carbon material layer is in liquid connection with the water through the base body, rather than being in direct contact with the surface of the water.

In an embodiment, the disclosure provides a multilayer body, wherein the carbon material layer is hydrophilic.

In an embodiment, the disclosure provides a multilayer body, wherein the carbon material layer is water permeable.

In an embodiment, the disclosure provides a multilayer body, wherein the carbon material layer has a porous structure.

In an embodiment, the disclosure provides a multilayer body, wherein the base body is hydrophilic.

In an embodiment, the disclosure provides a multilayer body, wherein the base body has a porous structure.

In an embodiment, the disclosure provides a multilayer body, wherein the porous structure is a porous capillary structure.

In an embodiment, the disclosure provides a multilayer body, wherein when the multilayer body is placed on the surface of water, water can be conveyed to the carbon material layer by virtue of capillary force provided by the capillary structure of the base body.

In an embodiment, the disclosure provides a multilayer body, wherein the base body comprises a water absorbent material with capillary pores and a material with low thermal conductivity.

In an embodiment, the disclosure provides a multilayer body, wherein the water absorbent material with capillary pores and the material with low thermal conductivity are composited with each other.

In an embodiment, the disclosure provides a multilayer body, wherein the material with low thermal conductivity is wrapped by the water absorbent material with capillary pores.

In an embodiment, the disclosure provides a multilayer body, wherein the material with low thermal conductivity is penetrated by the water absorbent material with capillary pores.

In an embodiment, the disclosure provides a multilayer body, wherein the water absorbent material with capillary pores is porous cellulose or hydrophilic fibers.

In an embodiment, the disclosure provides a multilayer body, wherein the cellulose is cellulose acetate, cellulose nitrate, or mixed cellulose.

In an embodiment, the disclosure provides a multilayer body, wherein the hydrophilic fibers are natural hydrophilic fibers and/or synthetic hydrophilic fibers. The natural hydrophilic fibers for example are plant fibers (e.g. cotton fibers, hemp fibers or wood fibers) or animal fibers (e.g. silk or wool).

In an embodiment, the disclosure provides a multilayer body, wherein the water absorbent material with capillary pores has pores having a pore diameter of from 1 to 1000 μm, for example from 10 to 100 μm.

In an embodiment, the disclosure provides a multilayer body, wherein the material with low thermal conductivity has a thermal conductivity of less than 1 W/(m·K), preferably less than 0.2 W/(m·K), and further preferably less than 0.1 W/(m·K).

In an embodiment, the disclosure provides a multilayer body, wherein the material with low thermal conductivity are selected from the group consisting of polyurethane (foam), rubber, glass wool, aluminum silicate and combinations thereof.

In an embodiment, the disclosure provides a multilayer body, wherein the base body comprises another water permeable material.

In an embodiment, the disclosure provides a multilayer body, wherein the another water permeable material is in contact with the carbon material layer.

In an embodiment, the disclosure provides a multilayer body, wherein the another water permeable material is in contact with the graphene oxide layer.

In an embodiment, the disclosure provides a multilayer body, wherein the another water permeable material is a mixed cellulose ester membrane.

In an embodiment, the disclosure provides a multilayer body, wherein the mixed cellulose ester membrane is a porous polyvinylidene difluoride-polypropylene membrane.

In an embodiment, the disclosure provides a multilayer body, wherein the carbon material layer has a thickness of from 1 to 100 μm, e.g. from 1 to 10 μm.

In an embodiment, the disclosure provides a multilayer body, wherein the carbon material layer has a porous structure (e.g. a capillary porous structure), wherein the porous structure has a pore diameter of from 10 to 1000 nm, preferably from 10 to 120 nm, and further preferably from 40 to 80 nm.

In an embodiment, the disclosure provides a multilayer body, wherein the carbon material layer has pores having a pore diameter of 40 to 80 nm whose total pore volume is 0.01 to 100 cm$^3$/g.

In an embodiment, the disclosure provides a multilayer body, wherein the pores having a pore diameter of 40 to 80 nm has a total pore volume is 0.01 to 10 cm$^3$/g.

In an embodiment, the disclosure provides a multilayer body, wherein graphene oxide has functional groups (or chemical bonds) selected from the group consisting of C—C, C—O, C=O, O—C=O and combinations thereof.

In an embodiment, the disclosure provides a multilayer body, wherein the graphene oxide is characterized by peaks corresponding to functional groups (or chemical bonds) including C—C, C—O, C=O and O—C=O in a C1s spectrum (i.e. 1s spectra of carbon) obtained by X-ray photoelectron spectroscopy (XPS).

In an embodiment, the disclosure provides a multilayer body, wherein the graphene oxide is synthesized by Hummers' method.

In an embodiment, the disclosure provides a multilayer body, wherein, the carbon material layer is obtained by using a wet chemistry method.

In an embodiment, the disclosure provides a multilayer body, wherein the wet chemical method is spin coating, spray coating or liquid deposition.

In an embodiment, the disclosure provides a multilayer body, wherein the base body has a thickness of from 0.1 to 10 cm, preferably from 1 to 5 cm.

In an embodiment, the disclosure provides a multilayer body, wherein the base body has a porous structure (e.g. a capillary porous structure), wherein the porous structure has a pore diameter of preferably from 1 to 1000 μm; further preferably from 10 to 100 μm.

In an embodiment, the disclosure provides a multilayer body, wherein the multilayer body is floatable on the surface of water.

In an embodiment, the disclosure provides a multilayer body, wherein the multilayer body is adapted to work under light irradiation.

In an embodiment, the disclosure provides a multilayer body, wherein the multilayer body is adapted to work under light irradiation in a floating state on a liquid.

In an embodiment, the disclosure provides a method for preparing a multilayer body, comprising:

a) obtaining a liquid in which a carbon material is dispersed;

b) coating or depositing the dispersion on a base body, wherein the base body is water permeable;

the carbon material comprises a substance selected from the group consisting of graphite, graphite, graphene, graphene oxide, graphene modified by chemical functional groups, carbon nanotubes and combinations thereof.

In an embodiment, the disclosure provides a method for preparing a multilayer body, wherein in step a) the carbon material has a size of from 1 nm to 1000 µm, for example, from 1 nm to 1000 nm, for example, from 1 to 1000 µm.

In an embodiment, the disclosure provides a method for preparing a g multilayer body, wherein the carbon material comprises graphene oxide.

In an embodiment, the disclosure provides a method for preparing a multilayer body, wherein in step b), the coating is spin coating or spray coating.

In an embodiment, the disclosure provides a method for preparing a multilayer body, wherein in step b), the deposition is filtration deposition or vacuum filtration deposition.

In an embodiment, the disclosure provides a method for preparing a multilayer body, wherein step a) comprises synthesizing graphene oxide by using Hummers' method.

In an embodiment, the disclosure provides a method for preparing a multilayer body, wherein the carbon material graphene oxide dispersion liquid in step a) is a graphene oxide dispersion liquid whose solvent is water.

In an embodiment, the disclosure provides a method for preparing a multilayer body, wherein the graphene oxide dispersion liquid in step a) has a concentration of from 1 to 10 mg/mL.

In an embodiment, the disclosure provides a multilayer body, which is prepared by any preparation method according to the disclosure.

In an embodiment, the disclosure provides use of the multilayer body according to the disclosure as a light absorber.

In an embodiment, the disclosure provides use of the carbon material layer as a light absorber, wherein the carbon material comprises a substance selected from the group consisting of graphite, graphite, graphene, graphene oxide, graphene modified by chemical functional groups, carbon nanotubes and combinations thereof.

In an embodiment, the disclosure provides use of a carbon material film as a light absorber, wherein the carbon material comprises graphene oxide.

In an embodiment, the disclosure provides use of a carbon material film as a light absorber, wherein the carbon material film has one or more of the following features:
 a) the carbon material film has a thickness of from 1 to 100 µm, for example from 1 to 10 µm;
 b) the carbon material film has pores having a pore diameter of from 10 to 120 nm, preferably from 40 to 80 nm;
 c) the carbon material film has pores having a pore diameter of from 40 to 80 nm whose total pore volume is from 0.01 to 100 $cm^3/g$, preferably from 0.01 to 10 $cm^3/g$.

In an embodiment, according to any use described herein, the light absorber may be used for evaporating a liquid by using the absorbed light energy.

In an embodiment, according to any use described herein, the light absorber may be further used for desalting sea water, purifying sewage water, separating different solvent or generating hot water vapor.

In an embodiment, the disclosure provides a multilayer body, wherein the base body comprises a base body and a carbon material layer disposed on the base body, wherein the base body is liquid to permeable;
the carbon material comprises a substance selected from the group consisting of graphite, graphene, graphene oxide, graphene modified by chemical functional groups and carbon nanotubes and combinations thereof.

In an embodiment, according to any multilayer body described herein, the carbon material layer has a convex surface.

In an embodiment, according to any multilayer body described herein, for the of the carbon material layer, the area of the convex surface is 1.2 times or more of the projection area of the convex surface, preferably 1.5 times or more.

In an embodiment, according to any multilayer body described herein, the convex surface is an arc surface, a conical surface or a folded surface.

In an embodiment, according to any multilayer body described herein, the conical surface has a vertex angle of from 60 to 120 degrees.

In an embodiment, according to any multilayer body described herein, the conical surface has a vertex angle of from 80 to 100 degrees.

In an embodiment, according to any multilayer body described herein, the base body comprises a thermally insulating material penetrated by a liquid absorbent material with a capillary structure.

In an embodiment, according to any multilayer body described herein, the base body comprises a polystyrene foam penetrated by a cotton wick.

In an embodiment, according to any multilayer body described herein, the carbon material layer has pores having a pore diameter of from 40 to 80 nm whose total pore volume is from 0.01 to 10 $cm^3/g$, preferably 0.01 to 1 $cm^3/g$, and further preferably from 0.01 to 0.1 $cm^3/g$.

In an embodiment, the disclosure provides a multilayer body, wherein the carbon material layer has a thickness of from 1 to 20 µm, e.g. from 3 to 8 µm, and e.g. 4 to 5 µm.

In an embodiment, the disclosure provides a multilayer body, wherein the carbon material has a particle size of from 0.01 to 10 µm, for example, from 0.1 to 5 µm, and for example, from 0.5 to 2 µm.

In an embodiment, the porous structure has a most frequent pore diameter of from 10 to 120 nm, preferably from 20 to 100 nm, preferably from 40 to 80 nm, and preferably from 40 to 60 nm.

In an embodiment, the carbon material layer has pores having a pore diameter of from 40 to 80 nm whose total pore volume is from 0.01 to 1 $cm^3/g$, for example from 0.01 to 0.1 $cm^3/g$, and for example from 0.04 to 0.6 $cm^3/g$.

In an embodiment, the carbon material has a peak in the range of from 20 to 60 nm in a pore diameter distribution plot, preferably in the range of from 30 to 50 nm.

In an embodiment, the carbon material has only one peak in the range of from 20 to 60 nm in a pore diameter distribution plot, preferably in the range of from 30 to 50 nm.

In an embodiment, for the pore diameter distribution plot of the carbon material, the peak thereof has a peak value of from 0.01 to 0.1 $cm^3/g$, preferably from 0.03 to 0.08 $cm^3/g$, further preferably from 0.04 to 0.06 $cm^3/g$, and further preferably from 0.05 to 0.06 $cm^3/g$.

In an embodiment, the pore diameter distribution plot is measured according to BJH theory.

In an embodiment, for the pore diameter distribution plot of the carbon material, D measured in nm is a variable of a horizontal axis of the plot, dV/d log D measured in $cm^3/g$ is a variable of a vertical axis of the plot, wherein V denotes total pore volume and D denotes pore diameter.

In an embodiment, the carbon material has a specific surface area of form 1 to 4000 $m^2/g$, for example from 1 to 1000 $m^2/g$, for example from 1 to 500 $m^2/g$, for example from 1 to 100 $m^2/g$, for example from 1 to 50 $m^2/g$, for example from 1 to 10 $m^2/g$, and for example from 10 to 30 $m^2/g$.

The disclosure provides a multilayer body which comprises a base body and a black-colored layer disposed on the base body, wherein the base body is liquid permeable and the black colored layer comprises a textile and a black substance.

In an embodiment, the black colored layer is liquid permeable.

In an embodiment, the black colored layer is gas permeable.

In an embodiment, the textile is woven textile or non-woven textile.

In an embodiment, the textile is selected from the group consisting denim, poplin cotton, composite twill, canvas, towel cloth and combinations thereof.

In an embodiment, the textile comprises non-woven textile (also referred to as nonwoven)

In an embodiment, the non-woven textile is a manufactured sheet, web or batt of directionally or randomly orientated fibers, bonded by friction, cohesion, adhesion or combinations thereof.

In an embodiment, the non-woven textile is prepared by a drylaying method (e.g. a carding method or an airlaying method), a polymer extrusion method (e.g. a spinlaying method or a meltdown web method) or a wet method. For example, the non-woven textile is prepared by a polymer extrusion method. (e.g. a spinlaying method or a meltdown web method)

The non-woven textile may have relatively high mechanical strength, relatively large porosity and good hydrophilicity.

In an embodiment, the multilayer body comprising the non-woven textile exhibits relatively high water vapor generation rate and high evaporation efficiency using solar energy.

In an embodiment, the textile has a fabric weight of from 20 to 200 g/m$^2$, for example from 40 to 180 g/m$^2$, for example from 60 to 160 g/m$^2$, for example from 180 to 140 g/m$^2$, for example from 100 to 120 g/m$^2$.

In an embodiment, the textile contains fibers.

In an embodiment, the textile comprises natural fibers (e.g. cotton, hemp, wool or silk), synthetic fibers or carbon fibers In an embodiment, the synthetic fibers comprise a material selected from the group consisting of terylene, polypropylene fiber, chinlon, spandex, acrylic fiber and combinations thereof.

In an embodiment, the black colored layer comprises textile selected from the group consisting of terylene non-woven fabric, polypropylene fiber non-woven fabric, chinlon non-woven fabric, spandex non-woven fabric, acrylic nonwoven fabric and combinations thereof.

In an embodiment, the black substance comprises a substance selected from the group consisting of black dye, black powder, black fibers and combinations thereof.

In an embodiment, the carbon material comprises a substance selected from graphite, graphene, graphene oxide, graphene modified by chemical functional groups, carbon nanotubes, carbon black and combination thereof.

In an embodiment, the black colored layer comprises a textile adhered with a black substance.

In an embodiment, the black colored layer comprises a textile covered with a black substance.

In an embodiment, the black colored layer comprises a textile blackened by a black dye.

In an embodiment, the black colored layer and/or the base body are thermally insulating.

In an embodiment, when the multilayer body is placed on the surface of water, the black colored layer is in liquid connection with the surface of water through the base body, rather than in direct contact with the surface of water.

In an embodiment, the multilayer body is placed on the surface of water, the base body with a capillary structure is capable of conveying water to the black colored layer in virtue of capillary force.

In an embodiment, the black colored layer has a thickness of from 1 to 10000 μm, for example from 1 to 5000 μm, for example from 1 to 2000 μm, for example from 1 to 1000 μm, for example from 1 to 100 μm, for example from 1 to 10 μm.

In an embodiment, the textile has a thickness of from 1 to 10000 μm, for example from 1 to 5000 μm, for example from 1 to 2000 μm, for example from 1 to 1000 μm, for example from 1 to 100 μm, for example from 1 to 10 μm.

In an embodiment, the black colored layer has a porous structure (e.g. capillary porous structure) having a pore diameter of from 10 to 1000 nm, preferably from 10 to 120 nm, and further preferably from 40 to 80 nm.

In an embodiment, the black colored layer has pores having a pore diameter of from 40 to 80 nm whose total pore volume is from 0.01 to 100 cm$^3$/g, for example, 0.01 to 10 cm$^3$/g, and preferably from 0.01 to 1 cm$^3$/g, and preferably from 0.01 to 0.1 cm$^3$/g.

In an embodiment, the black colored layer or the black substance has a specific surface area of from 1 to 4000 m$^2$/g, for example from 1 to 1000 m$^2$/g, for example from 1 to 500 m$^2$/g, for example from 1 to 100 m$^2$/g, for example from 1 to 50 m$^2$/g, for example from 1 to 10 m$^2$/g, for example from 10 to 30 m$^2$/g.

In an embodiment, the textile and/or black substance is hydrophilic.

In an embodiment, the carbon material layer/black colored layer contains a binder or a hydrophilic substance.

In an embodiment, the carbon material layer/black colored layer contains sodium alginate.

In an embodiment, the black colored layer has a convex surface.

In an embodiment, the area of the convex surface of the black colored layer is 1.2 times of the projection area of the convex surface, preferably 1.5 times or more.

In an embodiment, the convex surface is an arc surface, a conical surface or a folded surface.

In an embodiment, the vertex angle of the conical surface is from 60 to 120 degrees, for example from 80 to 100 degrees.

In an embodiment, the carbon material layer has a convex surface.

In an embodiment, the area of the convex surface of the carbon material layer is 1.2 times of the projection area of the convex surface, preferably 1.5 times or more.

In an embodiment, the convex surface is an arc surface, a conical surface or a folded surface.

In an embodiment, the vertex angle of the conical surface is 60 to 120 degrees, for example 80 to 100 degrees.

In an embodiment, the base body comprises a heat insulation material which is penetrated by a liquid absorbent material with a capillary structure.

In an embodiment, the base body comprises polystyrene foam penetrated by a cotton wick.

The invention provides a light absorbing device comprising any multilayer body described herein.

In an embodiment, the light absorbing device further comprises a liquid transfer means and/or a heat insulation means;
preferably, the liquid transfer means is in contact with the base body;

preferably, the heat insulation means wraps all of the base body or part of the base body;

preferably, the liquid transfer means comprises a liquid absorbent material with a capillary structure;

preferably, the thermal insulation means comprise a material with low thermal conductivity.

In an embodiment, the multilayer body, the base body or the black colored layer is liquid permeable, for example, water permeable.

In an embodiment, the liquid comprises water.

In an embodiment, the liquid absorbent material comprises a water absorbent g material with a capillary structure.

In an embodiment, the textile comprises cloth.

The disclosure is further described in detail with reference to the accompanying drawings and the embodiments. The illustrative embodiments of the disclosure and the description thereof are used to explain the disclosure and do not necessarily constitute a limitation of the disclosure.

The multilayer body in some of the following examples comprised a base body and a carbon material layer on the base body, wherein the base body was water permeable; the carbon material layer was a graphene oxide layer.

I. The Graphene Oxide was Prepared by the Following Methods:

A graphene oxide dispersion liquid was prepared by Hummers' method.

Raw materials: flake graphite (30 mesh, Sinopharm Chemical Reagent Co., Ltd., 99.99 wt % purity), 98 wt % concentrated sulfuric acid (analytical reagent/AR, Sinopharm Chemical Reagent Co., Ltd.), 30 wt % hydrogen peroxide (guaranteed reagent/GR, Sinopharm Chemical reagent Co., Ltd.), potassium permanganate (guaranteed reagent/GR, Sinopharm Chemical Reagent Co., Ltd.), 36 wt % hydrochloric acid (guaranteed reagent/GR, Sinopharm Chemical Reagent Co., Ltd.).

Low-temperature reaction stage: 120 mL of concentrated sulfuric acid was added to a 500 mL beaker. The beaker was subsequently put into an ice water bath. When the temperature of the concentrated sulfuric acid reached 0° C., graphite (5 g) was added to the beaker with stirring. After 30 minutes of stirring, 0.75 g of potassium permanganate was subsequently slowly added to the beaker while stirring and keeping the temperature of the reactants from exceeding 5° C. After 30 minutes of stirring, 15 g of potassium permanganate was slowly added to the beaker with stirring, and keeping the temperature of the reactants from exceeding 5° C. The mixture was then stirred for 30 minutes.

Medium-temperature reaction stage: the beaker containing the aqueous mixture was stirred for 2 hours in a water bath at 35° C. After stirring, the aqueous mixture was removed from the water bath, and then 225 mL of deionized water was subsequently slowly added into the aqueous mixture.

High-temperature reaction stage: the beaker containing the mixed solution was stirred for 30 min in a water bath at 98° C. A 3.5 wt % hydrogen peroxide solution was prepared in advance. After stirring, the mixed solution was taken away from the water bath, and then, 150 mL of the as-prepared 3.5 wt % hydrogen peroxide was added into the aqueous mixture. The resultant material with a color of bright yellow was obtained.

The resultant material was filtered while it was hot to remove most of the water, strong acid and the like therein. Then, the residual solid was rinsed with a 5 wt % hydrochloric acid solution to remove metal ions therein. Finally, the residual solid was repeatedly rinsed with distilled water until the washing solution had a pH that was substantially neutral, and then, the residual solid was dried in a drying oven for later use.

II. The Instruments and the Materials are Shown in the Following Table 1:

TABLE 1

| equipment | Model |
|---|---|
| scanning electron microscopy (SEM) | Dual-beam FIB 235, FEI Strata |
| X-ray photoelectron spectroscopy (XPS) | PHI 5000 Versa Probe equipped with a monochromatic Al Ka X-ray source |
| UV-visible spectroscopy | UV-3600, SHIMADZU |
| surface area and porosity analyzer | Tristar Micromeritics |
| infrared camera | Fluke Ti100 |
| solar simulator | Newport 94043A, Class AAA, equipped with an AM1.5G filter |
| electronic analytical scale | FA2004 |
| power meter | Coherent#1097901, 10 W, Active Area Diameter: 19 mm, The probe is coated with a titanium oxide layer by atomic layer deposition to suppress the heat caused by direct light irradiation. |
| Dewar flask | Shanghai Glass Instrument, Co. |
| beaker | Size of Dewar flask: diameter: 3 cm, height: 8 cm Size of beaker: diameter: 3 cm, height: 5 cm |
| porous mixed cellulose membrane | Size: diameter: 50 mm, pore diameter: 0.02 mm Composition: polyvinylidene fluoride (PVDF) and polypropylene |
| hydrophilic cellulose membranes | Composition: wood cellulose |

Example 1

FIG. 1 is a graph depicting a schematic diagram of multilayer body-1 of Example 1. As shown in the figure, multilayer body-1 comprises a base body 2 and a graphene oxide layer 1 disposed on the base body 2, wherein the base body 2 is a porous mixed cellulose membrane.

The method for preparing multilayer body-1 includes:

(1) Preparation of graphene oxide dispersion liquid: 0.4 g dried graphene oxide was dispersed in 100 mL deionized water, followed by 3 hours of ultrasonic treatment, to obtain a graphene oxide dispersion liquid having a graphene oxide concentration of 4 mg/mL.

(2) Assembling the graphene oxide layer: the graphene oxide layer was assembled by adopting a wet chemistry method. Specifically, a porous mixed cellulose membrane (composition: mixed cellulose of PVDF and polypropylene, 50 mm in diameter, 0.02 mm in pore diameter) was used as the base body. The graphene oxide dispersion liquid (30 mL) was deposited on the porous mixed cellulose membrane by applying a vacuum filtration method with a vacuum pressure of 0.07 MPa. After vacuum filtration, the product was dried at 60° C. for 5 hours under vacuum, thereby the multilayer body-1 of Example 1 was obtained.

The base body of multilayer body-1 was a porous mixed cellulose membrane. The porous mixed cellulose membrane was hydrophilic, water permeable and had a porous capillary structure. The porous capillary structure of the base body was capable of conveying water to the graphene oxide layer by virtue of capillary force.

To test the physical and chemical properties of the graphene oxide layer, the graphene oxide layer was stripped from the porous mixed cellulose membrane to obtain a stripped graphene oxide film. The stripped graphene oxide film was subjected to XPS, SEM and pore diameter distribution analysis.

Figure 4:
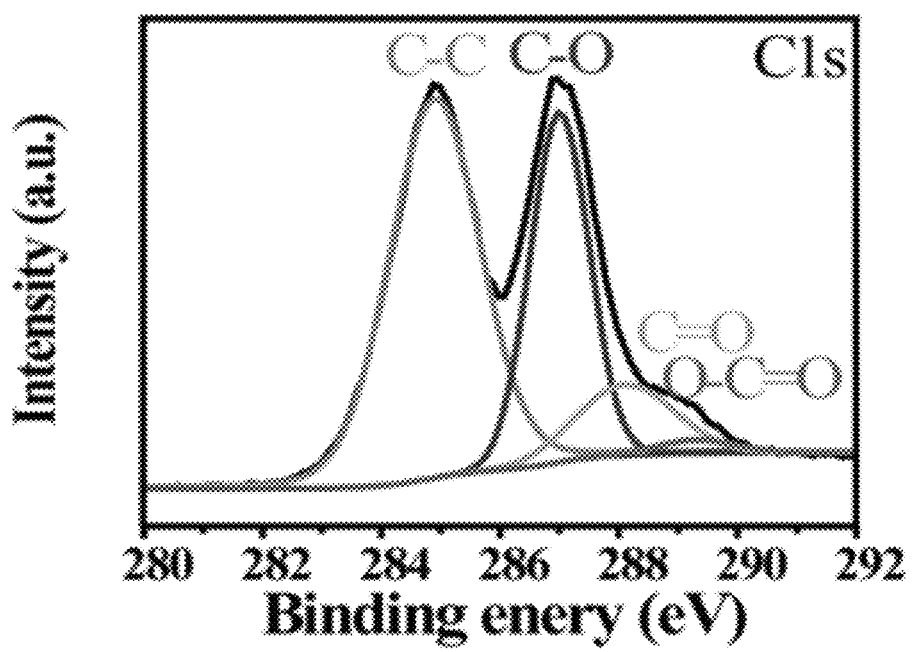
FIG. 4 is a graph depicting an XPS spectrum of a graphene oxide film.

X-ray photoelectron spectroscopy (XPS) was employed to investigate the functional groups in the graphene oxide. The X-ray photoelectron spectrometer was equipped with a monochromatic Al Ka X-ray source. The XPS analysis was performed under a vacuum of $5 \times 10^{-9}$ torr. FIG. 4 is a graph of an X-ray photoelectron spectrum of the graphene oxide layer. As shown in the graph, the 1s spectrum of carbon (C 1s spectrum) of the graphene oxide film mainly included four types of carbon bonds: C—C of aromatic rings at approximately 284.9 eV, C—O of hydroxyl and epoxy groups at approximately 286.9 eV, C=O of carbonyl group at approximately 288.1 eV, and O—C=O of carboxyl group at approximately 289.3 eV. Owing to the above four types of carbon bonds (or functional groups), graphene oxide exhibited excellent hydrophilicity and was capable of stably being dispersed in an aqueous solution. Therefore, the multilayer bodies may be fabricated in large scale by methods such as spray coating or spin coating, i.e., spray coating or spin coating a graphene oxide dispersion liquid on a base body having a large surface area. Furthermore, the hydrophilicity of the graphene oxide film was advantageous for water permeation.

Figure 5:
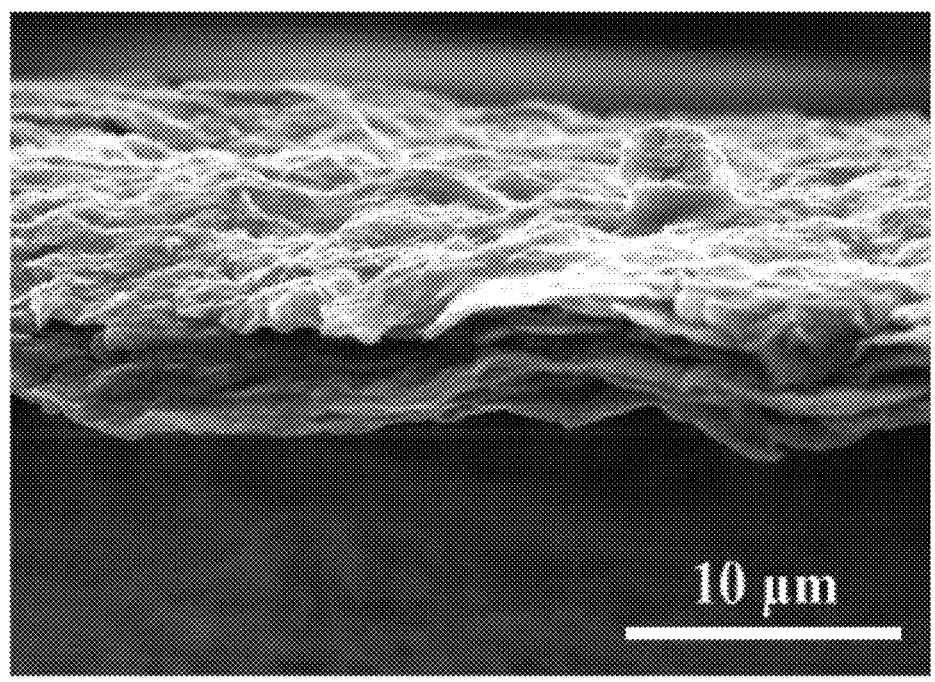
FIG. 5 is a graph depicting a cross-sectional SEM image of a graphene oxide film.

The cross-sectional morphology of the graphene oxide film was investigated using scanning electron microscopy (SEM). FIG. 5 depicts a scanning electron microscope image of the cross-section of a graphene oxide film of multilayer body-1. The graphene oxide film had a thickness of approximately 4 μm with a clearly multilayered structure. According to the characteristics of the graphene oxide, it can be deduced that the graphene oxide film consisted of a plurality of single-layer graphene oxide sheets, having a thickness of approximately 1 nm, laminated to each other. The multilayered structure was advantageous for g increasing the thermal resistance of the graphene oxide film, especially the thermal resistance perpendicular to the surface of the graphene oxide film. In fact, the thermal conductivity perpendicular to the surface of the graphene oxide was approximately 0.2 W/mK.

Figure 6:
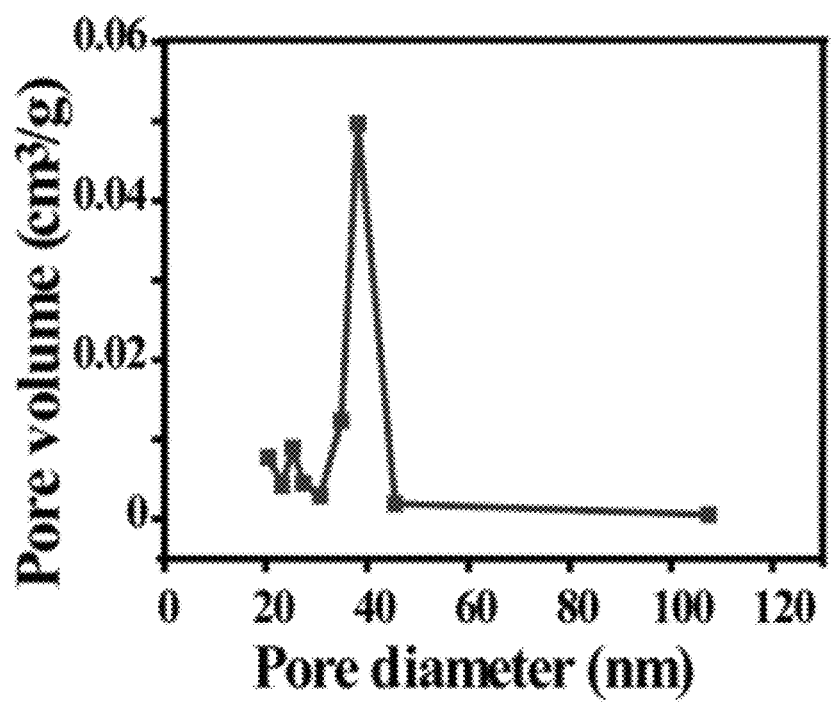
FIG. 6 is a graph depicting a pore diameter distribution plot of a graphene oxide film.

The pore diameter distribution of the graphene oxide film was investigated by a specific surface and porosity analyzer using the BET method at $-196°$ C. FIG. 6 is depicts a plot illustrating the total pore volume of the graphene oxide film as a function of pore diameter. As shown in the figure, pores with a pore diameter of 40 nm had the largest total pore volume, which was approximately 0.05 cm$^3$/g. Therefore, the typical pore diameter of the graphene oxide film was 40 nm. According to the BET analysis result, it can be concluded that the graphene oxide film had a porous (capillary) structure, which provided convenient channels for water to flow into the graphene oxide film and for water vapor to flow away from the graphene oxide film.

The specific surface area of the graphene oxide membrane was approximately 28 m$^2$/g, as measured by the BET method.

Figure 7:
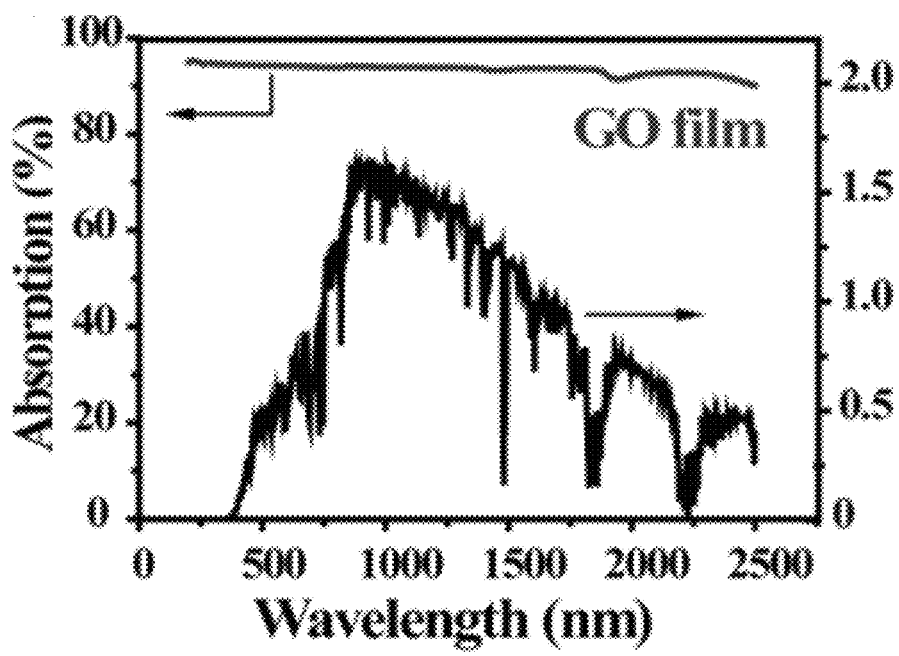
FIG. 7 is a graph depicting a light absorption plot of a graphene oxide film and an optical spectrum of an AM1.5G simulated solar illumination.

In addition, multilayer body-1 was also subjected to optical absorbance testing. Specifically, multilayer body-1 was wetted with water, and then, the optical absorbance of the graphene oxide layer side of the wetted multilayer body-1 was investigated under AM1.5G standard sunlight (from 200 to 2500 nm in wavelength) using an ultraviolet/visible-light spectrometer. Plot 1 in FIG. 7 illustrates the power density (W/m$^2$/nm) (corresponding to the right vertical axis) of the AM1.5G standard sunlight as a function of wavelength. Plot 2 in FIG. 7 illustrates the optical absorbance (%) of multilayer body-1 (corresponding to the left vertical axis) as a function of wavelength. The average optical absorbance of the wetted multilayer body-1 under AM1.5G standard sunlight (wavelength ranging from 200 to 2500 nm) was calculated to be 94%. This illustrated that g multilayer body-1 (especially the graphene oxide film) had a relatively high optical absorbance under broadband optical irradiation, making it suitable for being used as a light absorber.

Figure 8:
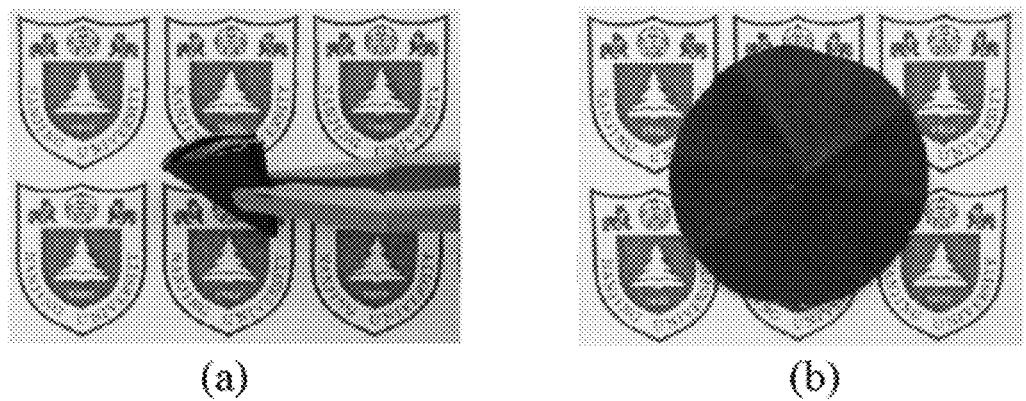
FIG. 8 contains optical images showing the process of a folding test.

In addition, multilayer body-1 was subjected to a folding resistance test. In particular, the multilayer body was repeatedly folded and unfolded 50 times. FIG. 8 includes optical images showing the process of the folding test. The image (a) in FIG. 8 is an optical image of multilayer body-1 in a folded state. The image (b) in FIG. 8 is an optical image of multilayer body-1, which had been folded 50 times, in an unfolded state. As shown in image (b) of FIG. 8, 50 times of folding/unfolding brought no notable damage to multilayer body-1. This demonstrated that multilayer body-1 had excellent folding resistance. Thus, the transporting and deploying of multilayer body-1 by folding them during transportation and unfolding them after reaching the destination is convenient. Therefore, multilayer body-1 is suitable for large-scale application. For example, large amounts of multilayer body-1s in a folded state can be transported to the seaside and then be disposed on the surface of the seawater after being unfolded, being used for the evaporation and desalination of seawater.

Example 2

Figure 2:
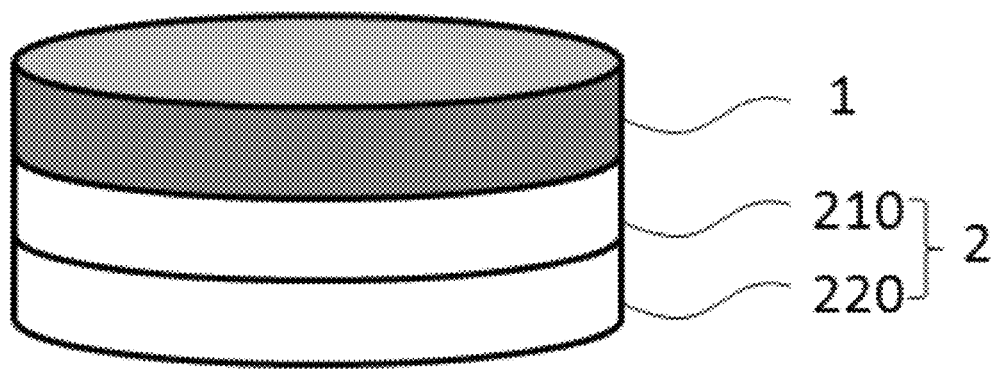
FIG. 2 is a graph depicting a schematic diagram of multilayer body-2.
Figure 3:
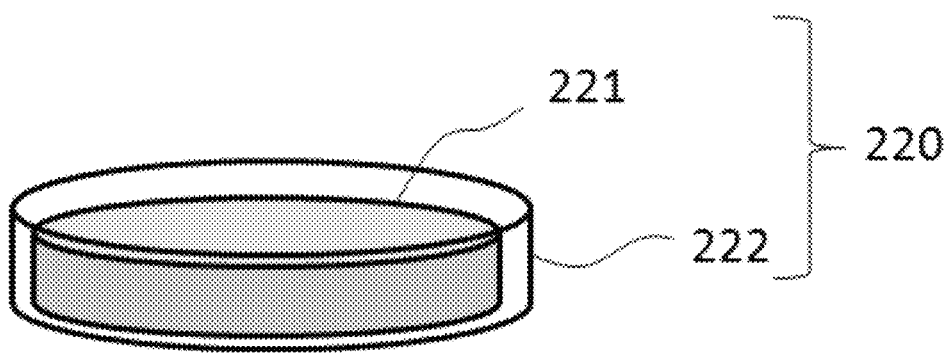
FIG. 3 is a graph depicting a schematic diagram of a part of a base body of multilayer body-2.

FIG. 2 depicts a schematic of multilayer body-2 of example 2. Multilayer body-2 comprised a base body 2 and a graphene oxide layer 1 disposed on the base body 2. The base body 2 comprised a porous mixed cellulose membrane 210 and a polystyrene foam plate wrapped by a hydrophilic cellulose membrane 220. The porous mixed cellulose membrane 210 was disposed between the graphene oxide layer 1 and the polystyrene foam plate 220 wrapped by a hydrophilic cellulose membrane. FIG. 3 depicts a schematic of a polystyrene foam plate wrapped by a hydrophilic cellulose membrane 220. As shown in the figure, the polystyrene foam plate 221 wrapped by a hydrophilic cellulose membrane 220 comprised a polystyrene foam plate 221 and a hydrophilic cellulose film 222 wrapping the polystyrene foam plate 221.

The method for preparing multilayer body-2 included the following steps:

(1) Preparation of the graphene oxide dispersion liquid: 0.4 g dried graphene oxide sheets was dispersed in 100 mL deionized water, and the mixture was subjected to an ultrasonic treatment for 3 hours, thereby a graphene oxide dispersion liquid having a graphene oxide concentration of 4 mg/mL was obtained.

(2) Assembly of the graphene oxide layer: the graphene oxide layer was assembled by adopting a wet chemistry method. In particular, 30 mL graphene oxide dispersion liquid was deposited on a porous mixed cellulose membrane (mixed cellulose of PVDF-polypropylene, 50 mm diameter, 0.02 mm pore diameter) by a vacuum filtration method with a suction of 0.07 MPa to deposit a layer of graphene oxide on the membrane, after which the product was subjected to vacuum drying for 5 hours at 60° C.

A polystyrene foam plate (0.04 W/mK thermal conductivity, Nanjing Shengnuoda Novel Material Co., Ltd.) having a thickness of approximately 1.6 cm and a diameter of approximately 3 cm was provided, and the foam plate was wrapped by a hydrophilic cellulose membrane (lignin contained) having a thickness of approximately 50 μm. Then, the porous mixed cellulose membrane deposited with the graphene oxide layer was laminated to the polystyrene foam plate wrapped by a hydrophilic cellulose membrane, wherein the porous mixed cellulose membrane was disposed between the graphene oxide layer and the polystyrene foam plate wrapped by a hydrophilic cellulose membrane, thereby multilayer body-2 of Example 2 was obtained.

Figure 9:
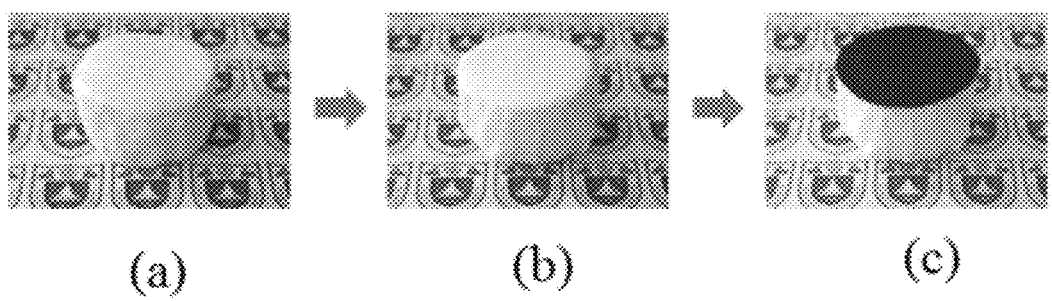
FIG. 9 contains graphs depicting an assembly process of multilayer body-2.

FIG. 9 depicts optical images showing the assembly process of multilayer body-2. Image (a) in FIG. 9 shows a polystyrene foam plate. Image (b) in FIG. 9 shows a polystyrene foam plate wrapped by a hydrophilic cellulose membrane. Image (c) in FIG. 9 shows the polystyrene foam plate wrapped by a hydrophilic cellulose membrane, upon which a graphene oxide layer was deposited, and constituted multilayer body-2.

Multilayer body-2 had a base body comprising a polystyrene foam plastic wrapped by a hydrophilic cellulose membrane and further comprised a porous mixed cellulose membrane. Since the hydrophilic cellulose membrane and the porous mixed cellulose membrane were both hydrophilic, water permeable and had a porous capillary structure, the base body of multilayer body-2 was hydrophilic, water permeable and had a porous capillary structure. The base body was capable of transferring water to the graphene oxide layer via capillary force.

The polystyrene foam had a relatively low thermal conductivity (e.g., approximately 0.04 W/(m·° C.)). Since the base body of multilayer body-2 was formed by a composition of a material with a low thermal conductivity (polystyrene foam) and a material with a capillary porous structure (hydrophilic cellulose membrane), it possessed properties including both thermal insulation and capillary water absorptivity. When multilayer body-2 was floating on the surface of the water, the thermally insulating base body was capable of confining heat to the graphene oxide layer, restraining heat from dissipating into the water body.

Example 3 (Water Vapor Generation Experiment 1)

Environment temperature: 16° C.; humidity: 60%; container: Dewar flask.

Three Dewar flasks containing the same amount of water were provided. The first flask was provided multilayer body-1, the second flask was provided multilayer body-2, and the third flask was provided with no multilayer body. For the Dewar flask provided a multilayer body, the multilayer body was floating on the surface of the water, being parallel to the surface of the water. The side of the base body of the multilayer body was in contact with the surface of the water (facing downwards), and the side of the graphene oxide layer faced away from the surface of the water (facing upwards). When the multilayer body was on the surface of the water, water could penetrate through the base body of multilayer body-1 and multilayer body-2, come in contact with the graphene oxide layer and then wet the graphene oxide layer.

The three Dewar flasks were irradiated by simulated solar radiation. The simulated solar irradiation was obtained by the following method: the light generated by a sunlight simulator (Newport 94043A) was filtered by an optical filter to obtain simulated solar radiation conforming to the AM1.5G spectrum standard. The optical power ($P_{in}$) of the simulated solar radiation was adjusted to 1 kW·m$^{-2}$.

Figure 11:
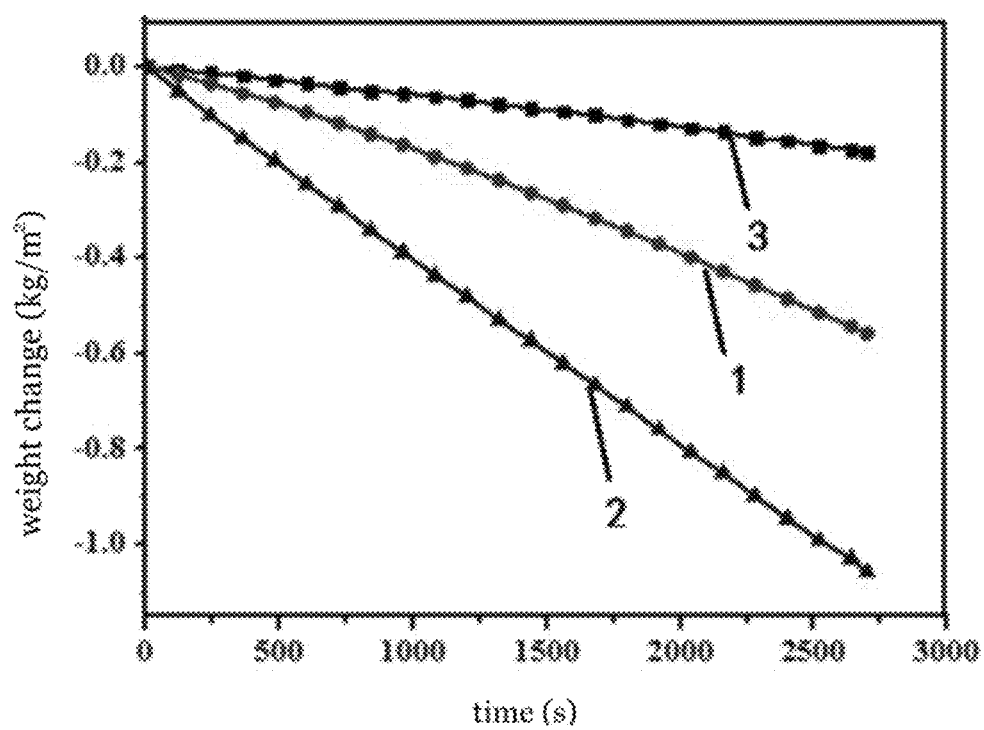
FIG. 11 is a graph depicting plots illustrating the cumulative weight change of water as a function of time during water vapor generation experiment 1.

Under simulated solar irradiation, the weight change of water in the three Dewar flasks (equivalent to the weight of generated water vapor) was measured in real time using an analytical balance from 0 to 2700 seconds. FIG. 11 is a graph of plots depicting the cumulative mass change of the three Dewar flasks as a function of time, in which plots 1, 2 and 3, respectively, denote the cumulative mass change of the Dewar flask with multilayer body-1, the Dewar flask with multilayer body-2 and the Dewar flask with no multilayer body. The weight loss rate of water, namely, the water vapor generation rate measured in kg/(m$^2$h), was determined according to the plots in FIG. 11. The water vapor generation rate was determined according to the data retrieved from the water vapor generation experiments from 1800 to 2700 s. The water vapor generation rate measured under simulated solar irradiation (Solar) is denoted by $m_S$.

For the water-filled Dewar flask provided with multilayer body-2 and the Dewar flask provided no multilayer body, the water vapor generation rate in dark was measured and is denoted by $m_D$.

Figure 13:
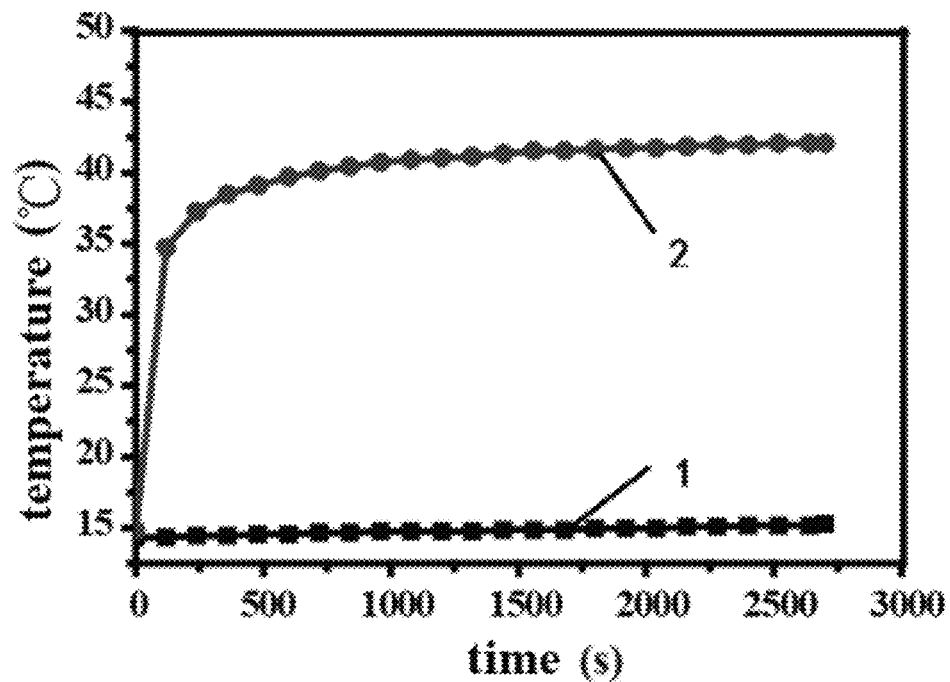
FIG. 13 is a graph depicting plots illustrating the surface temperature of the water and the temperature of the water vapor in a water-filled Dewar flask provided by multilayer body-2 as a function of time under light irradiation.
Figure 15:
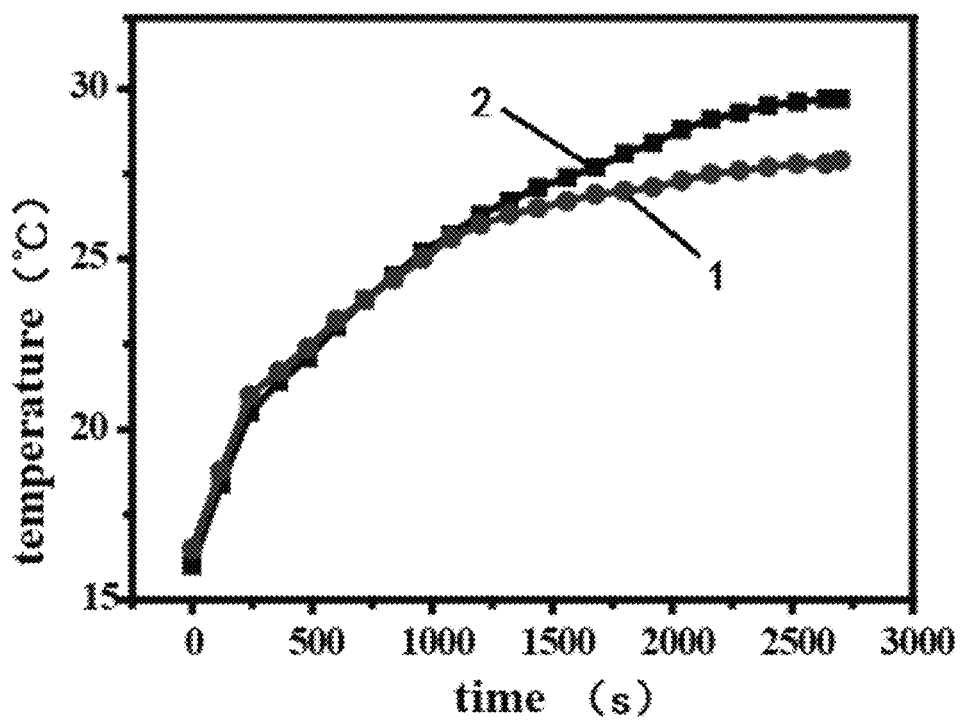
FIG. 15 is a graph depicting a plot illustrating the surface temperature of the water in a water-filled Dewar flask provided by multilayer body-1 as a function of time under light irradiation and a plot illustrating the surface temperature of the water in a water-filled beaker provided multilayer body-1 as a function of time under light irradiation.

For the water-filled Dewar flasks provided with multilayer body-1 and multilayer body-2, thermocouples were placed on the upper surface of the multilayer body and the surface of the water to measure the temperature of the generated water vapor, which is denoted by $T_S$ (° C.), and the surface temperature of the water, which is denoted by $T_W$ (° C.), respectively. At the beginning of the water vapor generation experiment, the initial temperature of the surface of the water is denoted by $T_{W0}$, the initial temperature of the generated water vapor is denoted by $T_{S0}$. After 45 minutes into the water vapor generation experiment, the surface temperature of the water is denoted by $T_{W45}$, and the temperature of the generated water vapor is denoted by $T_{S45}$. From the beginning to 45 minutes into the experiment, the variation of the surface temperature of the water is denoted as $\Delta T_W = T_{W45} - T_{W0}$. FIG. 13 is a graph depicting plots illustrating the surface temperature of the water and the temperature of the water vapor in the Dewar flask provided with multilayer body-2 as a function of time, wherein plot 1 illustrates the surface temperature of the water as a function of time, and plot 2 illustrates the temperature of the water vapor as a function of time. Plot 1 in FIG. 15 illustrates the surface temperature of the water in the Dewar flask provided with multilayer body-1 as a function of time.

A formula is introduced herein to calculate the solar energy utilization efficiency (η), e.g., the energy utilization efficiency from solar energy to water vapor.

In the formula, m denotes the net water vapor generation rate. The net water vapor net generation rate (m)=the water vapor generation rate under light ($M_S$)—the water vapor generation rate in the dark ($M_D$). $h_{LV}$ denotes the total liquid-vapor phase-change enthalpy (latent heat enthalpy+sensible heat enthalpy). The latent heat enthalpy of water is 2260 J/g, and the sensible heat enthalpy of water g is 4.2 J/gK. $P_{in}$ denotes the optical power density of the simulated solar radiation.

For the Dewar flask provided with multilayer body-1, the Dewar flask provided with multilayer body-2 and the Dewar flask provided no multilayer body, the water vapor generation rates and the solar energy utilization efficiencies are shown in table 2, and the surface temperatures of the water and the temperatures of the water vapor are shown in table 3.

Example 4 (Water Vapor Generation Experiment 2)

Environment temperature was 16° C., humidity was 60%, and beakers were provided as containers.

Water vapor generation experiment 2 was the same as water vapor generation experiment 1 except that the Dewar flasks were replaced with beakers.

Figure 12:
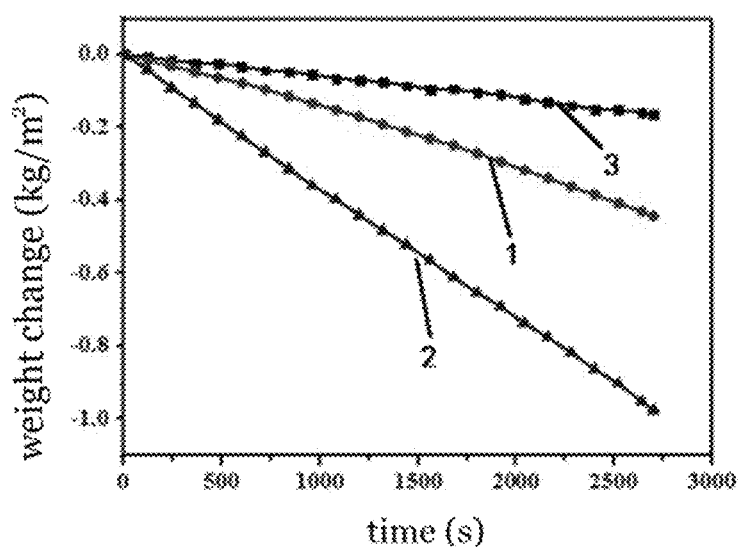
FIG. 12 is a graph depicting plots illustrating the cumulative weight change of water as a function of time during water vapor generation experiment 2.

FIG. 12 is a graph depicting plots illustrating the cumulative weight changes of three water-filled beakers as a function of time under simulated solar irradiation during 0~2700 s, wherein plots 1, 2 and 3, respectively, denote the cumulative weight changes of the water-filled beaker provided with multilayer body-1, the water-filled beaker provided with multilayer body-2 and the water-filled beaker provided no multilayer body as a function of time.

Figure 14:
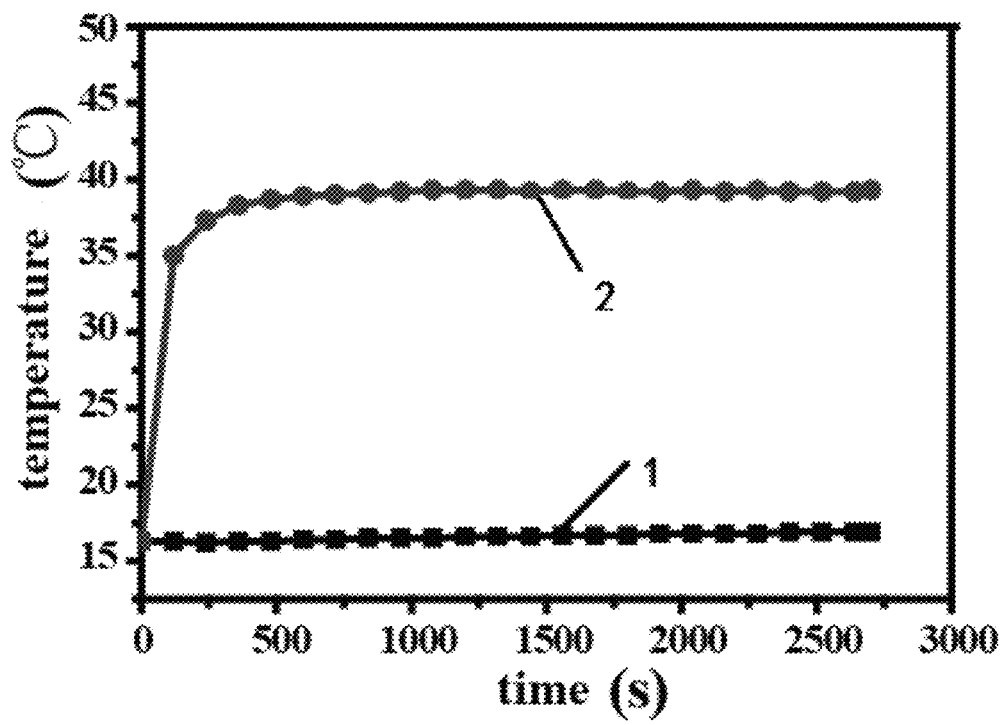
FIG. 14 is a graph depicting plots illustrating the surface temperature of the water and the temperature of the water vapor in a water-filled beaker provided by multilayer body-2 as a function of time under light irradiation.

FIG. 14 is a graph depicting plots illustrating the surface temperature of the water in the water-filled beaker provided with multilayer body-2 as a function of time under light irradiation, wherein plot 1 denotes the surface temperature of the water as a function of time, and plot 2 denotes the temperature of the water vapor as a function of time. Plot 2 in FIG. 15 illustrates the surface temperature of the water in the water-filled beaker that was provided with multilayer body-1 under light irradiation.

For the water-filled beakers provided with multilayer body-1, multilayer body-2 and no multilayer body, the water vapor generation rates and the solar energy utilization efficiencies are shown in Table 2, and the surface temperature of the water and the temperature of the water vapor are shown in Table 3.

The properties of multilayer body-1 and multilayer body-2 are further interpreted according to the data in Table 2 and Table 3.

3. Therefore, the efficient evaporation of water and efficient utilization of energy are facilitated. The base body 2 may further contain a material with a low thermal conductivity (such as a polystyrene foam plate 221), which was further beneficial for heat localization.

As can be seen from table 2, compared to the experiment in which no multilayer body was provided, higher water vapor generation rates can be achieved in experiments in which either multilayer body-1 or multilayer body-2 was provided, no matter whether the experiment occurs in a Dewar flask or in a beaker. This illustrates that the graphene oxide film was suitable for being used as a light absorber. Meanwhile, according to the above experiments, the graphene oxide film showed the following advantages as a light absorber: first, the graphene oxide film had a relatively high optical absorbance for light with a wide wavelength range; second, the porous structure of the graphene oxide membrane provided convenient channels for the inflow of water and outflow of water vapor; third, the graphene oxide film membrane had a low thermal conductivity in a direction that perpendicular to a surface of the membrane face so that it was favorable for keeping heat from dissipating into water; fourth, the graphene oxide film was hydrophilic, water permeable and had a porous capillary structure, so that it was easy for the graphene oxide film to absorb water and discharge water vapor when used as a light absorber; fifth, the hydrophilicity of the graphene oxide enabled the graphene oxide to be easily dispersed in an aqueous solution during the preparation of multilayer bodies, which is advantageous for the large-scale production of multilayer bodies.

Furthermore, as can be seen from table 2, the highest water vapor generation rate was achieved in experiments in which multilayer body-2 was provided, no g matter whether

TABLE 2

Water vapor generation rate and solar energy utilization efficiency

| | parameters | | | | | |
|---|---|---|---|---|---|---|
| | Water Vapor generation rate kg/(m²h) | | | | solar energy utilization efficiency (η) | |
| | light irradiation ($m_S$) | | Dark ($m_D$) | | | |
| | | | container | | | |
| Light absorber | Experiment 1 Dewar flask | Experiment 2 beaker | Experiment 1 Dewar flask | Experiment 2 beaker | Experiment 1 Dewar flask | Experiment 2 beaker |
| multilayer body-1 | 0.74 | 0.60 | 0.06 | 0.053 | 50% | 39% |
| multilayer body-2 | 1.45 | 1.31 | 0.06 | 0.135 | 84% | 78% |
| Without multilayer body | 0.24 | 0.22 | 0.15 | 0.053 | — | — |

Figure 10:
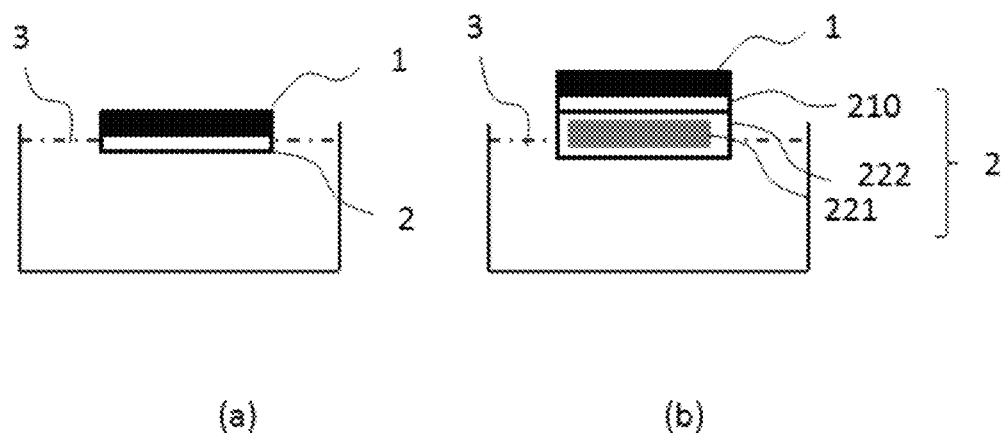
FIG. 10 contains graphs depicting a schematic of multilayered body-1 (graph a) floating on water and a schematic diagram of multilayer body-2 (graph b) floating on water.

Images (a) and (b) in FIG. 10 depict multilayer body-1 and multilayer body-2 floating on the surface of the water 3. The base body 2 of multilayer body-1 was a porous cellulose filter membrane; the base body 2 of multilayer body-2 comprised a porous cellulose membrane filter 210 and a polystyrene foam plate 221 wrapped by a hydrophilic cellulose film 222.

As shown in graph (b) in FIG. 10, by utilizing a water permeable base body 2 as a medium, the graphene oxide layer 1 of multilayer body-2 was in liquid connection with the surface of the water 3, instead of being in direct contact with the surface of the water 3. This structure was advantageous for confining heat to the graphene oxide layer and restraining heat from dissipating to the surface of the water in a Dewar flask or in a beaker. For example, a water vapor generation rate of approximately 1.45 kg/(m²h) was achieved in a Dewar flask provided with multilayer body-2 under light irradiation, which was approximately twice that obtained with a Dewar flask provided with multilayer body-1 under identical conditions and was 6 times that obtained with a Dewar flask provided with no multilayer body. Additionally, solar energy utilization efficiencies of 84% and 78% were achieved in respect to the Dewar flask and the beaker, respectively, provided multilayer body-2, which were 50% and 39% higher than that compared to a Dewar flask and a beaker provided with multilayer body-1. This illustrates that multilayer body-2 has a structure that is advantageous for achieving a higher water vapor generation rate and higher solar energy utilization efficiency.

TABLE 3

Water surface and the temperature of the water vapor changes

| | | parameter | | | |
|---|---|---|---|---|---|
| | The surface temperature of the water (° C.) | | | The temperature of water (° C.) | |
| | Initial ($T_{W0}$) | 45 min ($T_{W45}$) | Variation in temperature ($\Delta T_w$) | 45 min ($T_{S45}$) | |
| | | | container | | |
| Light absorber | experiment 1 Dewar flask | experiment 2 beaker | experiment 1 Dewar flask | experiment 2 beaker | experiment 1 Dewar flask | experiment 2 beaker |
| multilayer body-1 | 16 | 15 | 13.7 | 11.4 | — | — |
| multilayer body-2 | 17 | 15 | 0.9 | 0.6 | 40 | 39 |

As shown in Table 3, for the Dewar flask and beaker provided multilayer body-2, after 45 minutes of light irradiation, the temperature of the water vapor was approximately 40° C. and approximately 39° C., respectively, whereas the surface temperature of the water only rose by 0.9° C. and 0.6° C. In contrast, for the Dewar flask and the beaker provided multilayer body-1, after 45 minutes of light irradiation, the surface temperature of the water rose by 13.7° C. and 11.4° C. This illustrates that multilayer body-2 had a structure that was more advantageous for achieving a higher water vapor generation rate and higher solar energy utilization efficiency. The heat generated by the graphene oxide layer was confined to the multilayer body instead of dissipating into the surface of the water. When floating on the surface of the water as a light absorber, multilayer body-2 was capable of generating water vapor (39~40° C.), meanwhile, the surface temperature of the water remained almost unchanged.

According to the data in table 2 and table 3, the temperature difference between the upper surface and the lower surface of the multilayer body, the thickness of the multilayer body and the heat transmitted through the multilayer body in unit time was known. The thermal conductivity of the whole multilayer body-2 was calculated to be approximately 0.03 W/mK based on the Fourier law. This illustrates that multilayer body-2, including its base body, had a relatively low thermal conductivity in the wet state.

Example 5 Infrared Thermal Imaging Experiment

Two water-filled beakers provided multilayer body-1 and multilayer-2 were arranged same as that of Example 4 and irradiated by simulated solar radiation. The temperatures of the graphene oxide layers of multilayer body-1 and multilayer body-2 were measured by using an infrared camera. The temperature of the graphene oxide layer at the beginning of the experiment, 1 minute into the experiment and 45 minutes into the experiment were measured. The results are shown in Table 4.

TABLE 4

| | Initial value | 1 min | 45 min |
|---|---|---|---|
| multilayer body-1 | 14.4° C. | 19.9° C. | 30.7° C. |
| multilayer body-2 | 12.9° C. | 32.1° C. | 38.8° C. |

As can be seen from Table 4, the temperature of multilayer body-2 rose from 12.9° C. to 32.1° C. within 1 minute into the light irradiation experiment. At 45 min into the experiment, the temperature rapidly rose to 38.8° C. The temperature of multilayer body-1 rose from 14.4° C. to 19.9° C. within 1 minute into the light irradiation experiment. At 45 min into the experiment, the temperature of multilayer body-1 rose to 30.7° C. This illustrates that the graphene oxide layer was capable of reaching a relatively high temperature when irradiated by light having a power density of 1 kW·m$^{-2}$. It can be concluded that multilayer body-2 can be heated up fast and can stably retain a relatively high temperature, which is advantageous for the rapid generation and volatilization of water vapor.

According to tables 2, 3 and 4, it can be concluded that multilayer body-1 and multilayer body-2 both exhibited relatively high water vapor generation rates and high optical absorbances. This illustrates that the graphene oxide layer is suitable as a light absorber. Furthermore, the base body of multilayer body-2 had a better performance of thermal insulation, which resulted in (1) a higher water vapor generation rate, (2) a higher solar energy utilization efficiency, (3) a higher temperature of water vapor, (4) a higher heat-up speed and a higher stable temperature, and (5) a minor temperature change at the surface of the water.

Example 6 Seawater Desalination Experiment

Multilayer body-2 was used to evaporate three types of simulated seawater according to the steps in water vapor generation experiment 4 (wherein the container was a beaker). The evaporated water vapor was condensed and collected to obtain desalted seawater. The three types of simulated seawater were North Sea seawater (with a NaCl content of 1.4 wt %), Red Sea seawater (with a NaCl content of 4.1 wt %) and global seawater whose salt content equaled the global average value (with a NaCl content of 3.5 wt %). The salt contents of the three types of seawater before and after desalination are shown in Table 5:

TABLE 5

| | North Sea seawater | Red Sea water | Global Seawater |
|---|---|---|---|
| Desalination front | 5200 mg/L | 15228 mg/L | 13000 mg/L |
| Desalination method | 29 mg/L | 6.33 mg/L | 15.m1 mg/L |

According to table 5, multilayer body-2 can be used for seawater desalination. The simulated seawater had a salt content after desalination.

Example 7 Evaporation Cycling Test Under Light Irradiation

An evaporation cycling test was carried out in a water-filled beaker provided with multilayer body-2 under light irradiation according to the steps described in example 4. A total of 10 cycles were carried out, with every cycle lasting for more than 1 hour. The water vapor generation rate ins of each cycle, measured in kg/(m²h), is shown in Table 6

TABLE 6

| | Cycle number | | | | |
|---|---|---|---|---|---|
| | 1 | 2 | 3 | 4 | 5 |
| $m_S$ | 1.158 | 1.157 | 1.152 | 1.136 | 1.112 |
| | Cycle number | | | | |
| | 6 | 7 | 8 | 9 | 10 |
| $m_S$ | 1.138 | 1.163 | 1.125 | 1.114 | 1.127 |

According to Table 6, multilayer body-2 had good cycling stability. The water vapor generation rate remained stable even after a longtime light irradiation cycling experiment with multiple cycles.

Example 8

Optical absorbances of a plurality of multilayer bodies with different shapes were measured in example 8.

Figure 16:
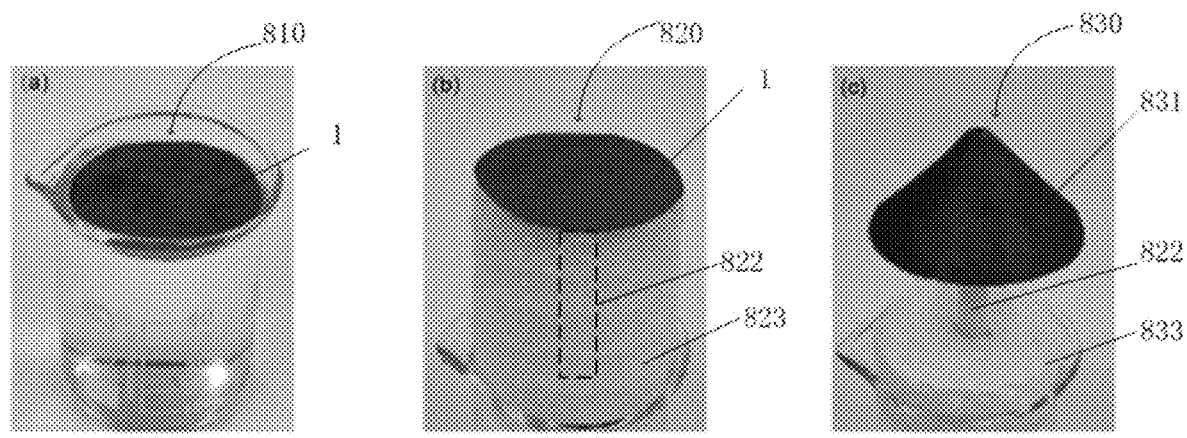
FIG. 16 contains optical images illustrating multilayer bodies 810, 820 and 830 in water-filled beakers.

FIG. 16 contains optical images of multilayer bodies 810, 820 and 830 in water-filled beakers.

As shown in a of FIG. 16, multilayer body 810 included a carbon material layer 1 and a base body. The carbon material layer 1 was a planar graphene oxide layer prepared according to the method described in Example 1. The base body was a porous mixed cellulose membrane, which was laminated with the carbon material layer 1. The diameter of multilayer body 810 was approximately 4.5 cm.

As shown in b of FIG. 16, multilayer body 820 included a carbon material layer 1 and a base body, in which the carbon material layer 1 was a planar graphene oxide layer prepared according to the method described in example 1. The base body comprised a porous mixed cellulose membrane, which was laminated with the carbon material layer. The base body was further composed of a polystyrene foam 823 (with a thermal conductivity of 0.03 W/mK) having a thickness of 5 cm and a diameter of 4.5 cm. The polystyrene foam 823 was penetrated by a cylindrical cotton wick 822 having a diameter of approximately 7 mm. One end of the cotton wick 822 was in contact with the porous mixed cellulose membrane.

As shown in c of FIG. 16, a multilayer body 830 comprised a carbon material layer 831 and a base body. The carbon material layer was a graphene oxide layer prepared according to the method described in example 1, with the graphene oxide layer having a convex shape. The base body comprised a porous mixed cellulose membrane, which was laminated with the carbon material layer 1. The convex surface of the carbon material layer 831 was a conical surface with a vertex angle of approximately 90 degrees, and the diameter of the bottom of the conical surface of the carbon material layer was approximately 4.5 cm. The base body was further composed of a polystyrene foam 833 having a thickness of 1 cm and a diameter of 4.5 cm (with a thermal conductivity of 0.03 W/mK). The polystyrene foam was penetrated by a cylindrical cotton wick 822 having a diameter of 7 mm and a height of approximately 6 mm. One end of the cotton wick 822 was in contact with the porous mixed cellulose membrane.

Example 9 (Water Vapor Generation Experiment 4)

The environment temperature was 16° C.; the humidity was 60%. Beakers were provided as containers. Three water-filled beakers having an inner diameter of approximately 4.5 cm and a height of approximately 5 cm were provided, each of them containing the same amount of water (approximately 60 mL). Multilayer bodies 810, 820 and 830 were floating on the surface of the water in the beakers, with the side of the graphene oxide layer facing away from the surface of the water (facing upwards), and the side of the base body being in contact with the surface of the water (facing downwards). When the multilayer body was placed on the surface of the water, the graphene oxide layer could be wetted by the water permeating through the base body.

Distilling experiments were conducted in the three beakers under light irradiation and in the dark. A simulated solar irradiation, the same as that of Example 3, was applied. The cumulative weight change of the water in the beakers (which was equivalent to the mass of generated water vapor) was measured in real time during 0~1800 s of the experiment by using an analytical scale.

Figure 17:
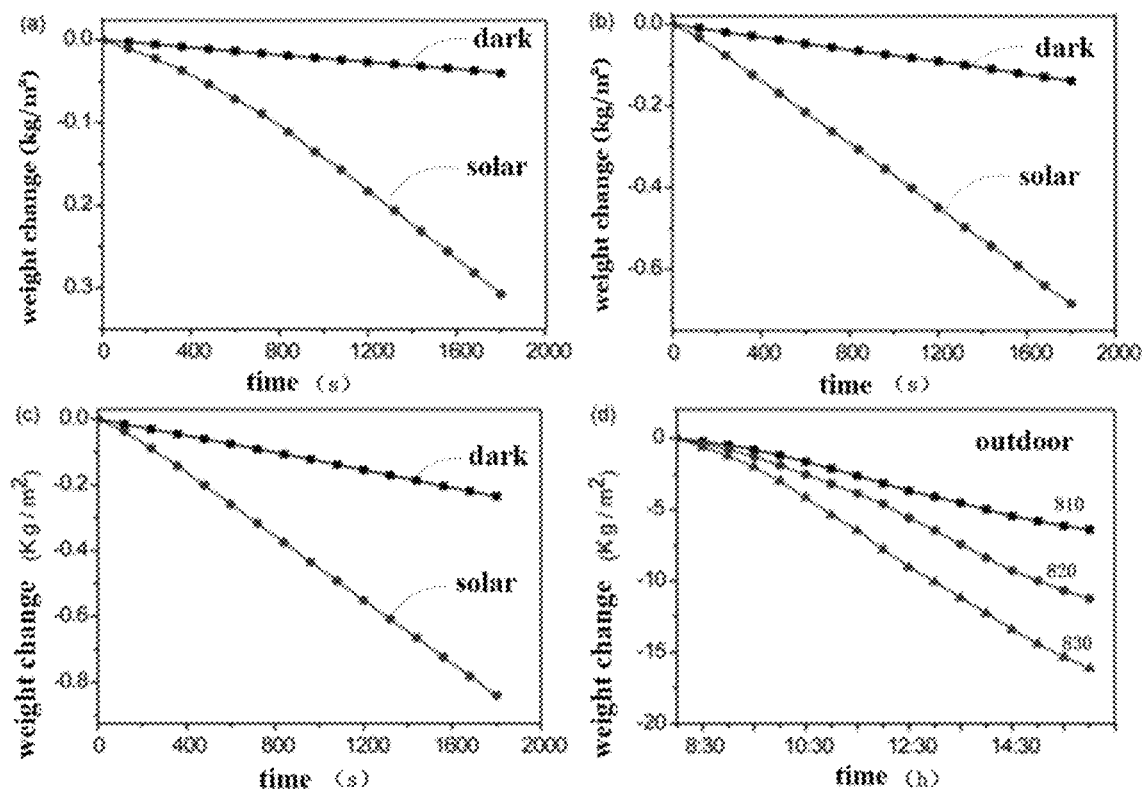
FIG. 17 includes graphs (a) (b) and (c) depicting plots illustrating the cumulative weight change of water-filled beakers provided by multilayer bodies 810, 820, and 830, respectively, as a function of time, in dark and under light irradiation.

Graphs (a), (b) and (c) in FIG. 17 illustrate the cumulative weight change of the beakers provided with multilayer bodies 810, 820 and 830 as a function of time under light irradiation or in the dark. According to the weight loss rate of water, the amount of the generated water vapor by mass measured in kg/(m²h) can be obtained. The water vapor generation rate was calculated according to the measured data of the water vapor generation amount. $M_S$ denotes the water vapor generation rate under light irradiation (Solar), $M_D$ denotes the water vapor generation rate in the dark (Dark). The results are shown in table 7:

TABLE 7

| | parameter | | |
|---|---|---|---|
| | carbon material layer kg/(m²h) | | Solar energy |
| multilayer body | Light irradiation ($m_S$) | In dark ($m_D$) | utilization efficiency (η) |
| multilayer body 810 | ~0.75 | ~0.08 | 49% |
| multilayer body 820 | ~1.41 | ~0.28 | 76% |
| multilayer body 830 | ~1.74 | ~0.47 | 85% |

According to table 7, multilayer body 830 exhibited a higher water vapor generation rate than did multilayer bodies 810 and 820, no matter whether under light irradiation or in the dark. In addition, the base body of multilayer body 820 comprised a polystyrene foam layer, which imparted upon multilayer body 820 a good thermal insulating performance. Therefore, multilayer body 820 exhibited a higher water vapor generation rate than did multilayer body 810.

Example 10

Distillation experiments were conducted with the water-filled beakers provided with multilayer bodies 810, 820 and 830, as provided in Example 9.

Figure 18:
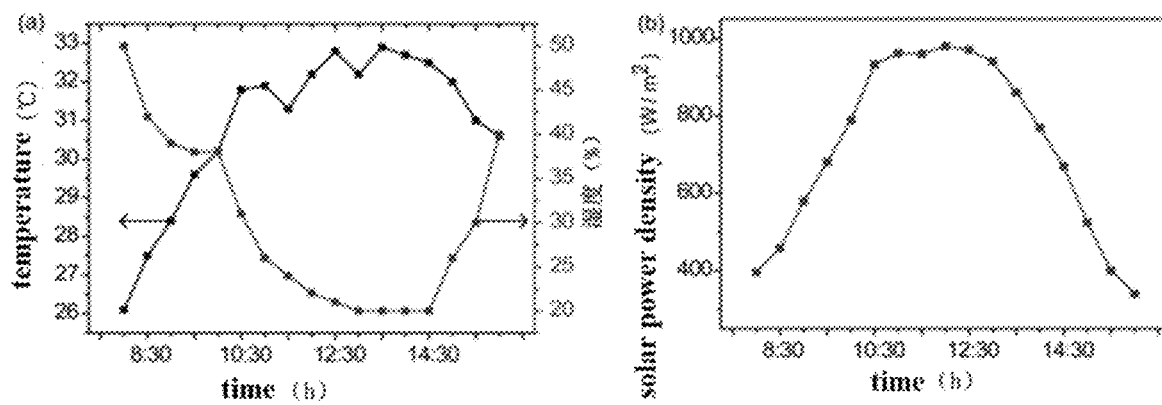
FIG. 18 includes a graph (a) depicting plots illustrating the temperature change as a function of time and the humidity change as a function of time during an outdoor distillation experiment, and a graph (b) depicting plots illustrating the power density of solar irradiation as a function of time on the day of that experiment.

The experiments were conducted on October 2016, from 8:00 to 16:00 in Nanjing, China. FIG. 18 contains graph (a) illustrating the temperature and humidity of the day of this experiment as a function of time, and graph (b) illustrating the solar power density of that day as a function of time.

Graph (d) of FIG. 17 illustrates the water vapor generation rates of the water-filled beakers provided with multilayer bodies 810, 820, and 830 under irradiation of outdoor sunlight. These water vapor generation rates were 0.8 Kg/m$^2$h, 1.4 Kg/m$^2$h and 2.0 Kg/m$^2$h, respectively.

As can be seen from the above data, compared to those of multilayer bodies 810 or 820, whose carbon material layer had a planar shape, multilayer body 830, whose carbon material layer had a convex shape, had a larger area for receiving light under the same occupied area, which was beneficial for absorbing more light. Therefore, multilayer body 830 had the virtue of exhibiting a higher solar energy utilization efficiency. In addition, the carbon material layer having a convex surface (especially a conical surface) was sufficiently capable of utilizing sunlight radiated at different angles so that it had a low dependency on the angle of sunlight.

If the scatter of the multilayer bodies was assumed to be 15%, the light absorbed by multilayer bodies 830 and 810 from 6:00 to 18:00 (sunrise at 6:00 and sunset at 18:00) was 700 W/m$^2$ and 565 W/m$^2$, respectively. That is, multilayer body 830 was capable of absorbing approximately 25% more light than could multilayer body 810 outdoors.

Example 11

Multilayer body-3 was provided in example 11 and comprised a base body and a black-colored layer deposited on the base body.

Specifically, the black-colored layer was a nonwoven textile layer whose surface was coated with carbon black. The size and the preparation method of the nonwoven textile layer were as follows:

The nonwoven textile (purchased from Guangdong Jiaxinda Co., Ltd., 120 g/m$^2$ of fabric weight): a melt-blown nonwoven textile mainly made of polyester fiber in the shape of a circle with a diameter of 4.5 cm and having a thickness of 0.8 mm.

The surface of one side of the nonwoven textile was spray painted with carbon black powder (Degussa Germany, Printex U) with a painting thickness of approximately 0.8 mm. In particular, a certain amount of carbon black powder and sodium alginate powder were provided, and then, the two powders were mixed with water in a ratio of carbon black:sodium alginate:water=0.1 g:0.01 g:1 ml. The mixture was subjected to ultrasonication for two hours in an ultrasonic dispersion machine, followed by being heated for half an hour with stirring to obtain a spraying liquid. Before use, the spraying liquid was subjected to ultrasonication for half an hour followed by being evenly shaken. Then, the spraying liquid was poured into a spraying machine to carry out the spray painting. The spraying parameters of the spray gun, such as the spraying speed, the spraying distance to the object and the like, were controlled manually. Two liters spraying liquid was spray painted per square meter.

The sodium alginate was a hydrophilic binder, which could improve the adhesion of the carbon black particles; thus, the service life of the material was prolonged, and the hydrophilicity of the material was improved.

The base body was polystyrene foam that had a thickness of 2 cm and a diameter of 4.5 cm (0.03 W/mK of thermal conductivity), and the polystyrene foam was penetrated by a cylindrical cotton wick, having a diameter of approximately 7 mm and a height of approximately 3 cm. One end of the cotton wick was in contact with the porous mixed cellulose membrane.

The parameters of the carbon black powder include:
carbon black grade: regular color channel (RCC); blackness value Myr %: 244; tint strength (%, IRB3): 108; volatiles %: 6; oil absorption, g/100 g: 420; PH value: 4; sieve residue, 0.044 mm mesh size, ppm: ≤300; ash content, %: 0.04; toluene extract, %: 0.15; compacted density, g/l: 130; BET surface area, m$^2$/g: 100; primary particle size, nm: 25.

Example 12

A multilayer body ("multilayer body-4") was provided in example 12, which comprised a base body and a black-colored layer deposited on the base body.

Specifically, the black-colored layer was a nonwoven textile layer dyed black by black dye. The size and the preparation method of the nonwoven textile layer were as follows:

The nonwoven textile (purchased from Guangdong Jiaxinda Co., Ltd., 100 g/m$^2$ of fabric weight) was a melt-blown nonwoven textile mainly made of polyester fiber. The nonwoven textile was in the shape of a circle with a diameter of 4.5 cm and a thickness of 0.6 mm.

The base body was a polystyrene foam that had a thickness of 2 cm and a diameter of 4.5 cm (0.03 W/mK of thermal conductivity), and the polystyrene foam was penetrated by a cylindrical cotton wick, having a diameter of approximately 7 mm and a height of approximately 3 cm. One end of the cotton wick was in contact with the porous mixed cellulose membrane.

Example 13 (Water Vapor Generation Experiment 5)

Environment temperature was 18° C. Humidity was 50%. Beakers were provided as containers. Three beakers, in which the same amount of water (approximately 60 mL) was contained, having an inner diameter of approximately 4.8 cm and a height of approximately 5 cm were provided. Multilayer body-3 and multilayer body-4 were placed on the surface of the water in the beakers in a floating manner, with the side of the nonwoven textile layer facing away from the surface of the water (facing upwards) and the side of the base body of the multilayer body being in contact with the surface of the water (facing downwards). When the multilayer body was placed on the surface of the water, the nonwoven textile layer could be wetted by the water that penetrated through the base body.

The distilling experiment was carried out in the two beakers under simulated solar irradiation and in the dark. The simulated solar radiation had the same parameters as that of Example 3. The cumulative weight change of the water in the beakers (equivalent to the mass of the generated water vapor) was measured by an analytical scale in real time during 0~1800 s.

The water vapor generation rate by mass, measured in kg/(m$^2$h), was obtained according to the weight loss rate of the water. The water vapor generation rate was calculated according to the weight of the generated water vapor. The water vapor generation rate under simulated solar irradiation (Solar) and in the dark (Dark) are denoted by $m_S$ and $m_D$, respectively. The results are shown in table 8:

TABLE 8

| multilayer body | water vapor generation rate kg/(m²h) | | solar energy utilization efficiency (η) |
| --- | --- | --- | --- |
| | simulated solar irradiation ($m_S$) | Dark ($m_D$) | |
| multilayer body-3 | 1.40 | 0.17 | 81.4% |
| multilayer body-4 | 1.46 | 0.18 | 84.7% |

According to table 8, multilayer body-3 and multilayer body-4 both had relatively high water vapor generation rates and solar energy conversion efficiencies.

Example 14

Water vapor generation experiments were carried out in outdoor environments using black denim, black poplin cotton, black composite twill cotton, black canvas and black towel cloth as the black-colored layer of the multilayer body, the size parameters of the multilayer body were the same as described in examples 11 and 12.

The experiment was conducted on the day of Dec. 30, 2016. The outdoor temperature was from 0° C. to 9° C., the total amount of light was 9.43 MJ/m², and the humidity was approximately 40%. The liquid to be distilled was water. The experiment results are shown in table 9:

TABLE 9

| items | amount of generated water vapor kg/m² | solar energy conversion rate % |
| --- | --- | --- |
| multilayer body-3 | 2.21 | 58.2% |
| multilayer body-4 | 2.18 | 57.4% |
| black denim | 2.05 | 53.9% |
| black poplin cotton | 1.76 | 46.3% |
| black composite twill cotton | 1.97 | 51.8% |
| black canvas | 1.87 | 49.2% |
| black towel cloth cotton | 1.98 | 52.1% |

According to table 9, the multilayer bodies comprising textiles were capable of producing a large amount of water vapor and had a high solar energy utilization efficiency. Particularly, multilayer body-3 and multilayer body-4 produced larger amounts of water vapor and exhibited higher solar energy utilization efficiencies. This illustrates that the nonwoven textile was more suitable as a light absorber to evaporate liquid by absorbing light energy.

We claim:

1. A multilayer body, comprising a base body and a black-colored layer disposed on the base body, wherein:
   the base body comprises a water absorbent material with capillary pores and a material with low thermal conductivity;
   the water absorbent material with capillary pores wraps completely around the material with low thermal conductivity; and
   the material with low thermal conductivity has a thermal conductivity of less than 1 W/(m·K).

2. The multilayer body of claim 1, wherein the black-colored layer has a convex surface.

3. The multilayer body of claim 2, wherein the area of the convex surface of the black-colored layer is 1.2 times of the projection area of the convex surface.

4. The multilayer body of claim 2, wherein the convex surface is an arc surface, a conical surface, or a folded surface.

5. The multilayer body of claim 1, wherein the material with low thermal conductivity has a thermal conductivity of less than 0.2 W/(m·K).

6. The multilayer body of claim 1, wherein the water absorbent material with capillary pores is porous cellulose or hydrophilic fibers.

7. The multilayer body of claim 1, wherein the base body comprises a polystyrene foam penetrated by a cotton wick.

8. The multilayer body of claim 1, wherein at least one of the following is satisfied:
   the base body is liquid permeable;
   the base body is hydrophilic;
   the black-colored layer is liquid permeable;
   the black-colored layer is gas permeable; and
   when said multilayer body is placed on the surface of water, said black-colored layer is in liquid connection with the surface of the water through said base body, rather than in direct contact with the surface of water.

9. The multilayer body of claim 1, wherein at least one of the following is satisfied:
   said material with low thermal conductivity is selected from the group consisting of polyurethane, rubber, glass wool, aluminum silicate, and combinations thereof; and
   said black-colored layer comprises a textile and a black substance.

10. The multilayer body of claim 9, wherein said black substance comprises a substance selected from the group consisting of black dye, black powder, black fibers, and combinations thereof.

11. The multilayer body of claim 9, wherein said black substance comprises a carbon material.

12. The multilayer body of claim 11, wherein said carbon material comprises a substance selected from the group consisting of graphite, graphene, graphene oxide, graphene modified by chemical functional groups, carbon nanotubes, carbon black, and combinations thereof.

13. A multilayer body, comprising a base body and a carbon material layer disposed on the base body, wherein:
   the base body is water permeable;
   the base body comprises a water absorbent material with capillary pores and a material with low thermal conductivity;
   the water absorbent material with capillary pores wraps completely around the material with low thermal conductivity; and
   the material with low thermal conductivity has a thermal conductivity of less than 1 W/(m·K).

14. The multilayer body of claim 13, wherein the carbon material layer is formed of a carbon material selected from the group consisting of: graphite, graphene, graphene oxide, graphene modified by chemical functional groups, carbon nanotubes, and combinations thereof.

15. The multilayer body of claim 13, wherein at least one of the following is satisfied:
   said carbon material layer is water permeable;
   said carbon material layer is hydrophilic;
   said carbon material layer has a porous structure;
   said carbon material layer comprises a graphene oxide layer; and
   said base body is hydrophilic.

16. The multilayer body of claim 15, wherein at least one of the following is satisfied:
said carbon material layer has a porous capillary structure;
the graphene oxide layer consists of a plurality of single-layer graphene oxide layers laminated to each other;
the graphene oxide layer is formed of graphene oxide synthesized by Hummers' method; and
the graphene oxide layer is formed of graphene oxide having functional groups selected from the group consisting of C—C, C—O, C=O, O—C=O, and combinations thereof.

17. A light absorbing device, comprising the multilayer body of claim 1.

18. A light absorbing device, comprising the multilayer body of claim 13.

19. A method for absorbing light, comprising using the multilayer body according to the multilayer body of claim 1 as a light absorber under light irradiation;
optionally, the method further comprising evaporating a liquid by using the light energy the multilayer body absorbed; and
optionally, the method further comprising desalting sea water, purifying sewage water, separating different solvent, or generating hot steam, by using the light energy the multilayer body absorbed.

20. A method for absorbing light, comprising using the multilayer body according to the multilayer body of claim 13 as a light absorber under light irradiation;
optionally, the method further comprising evaporating a liquid by using the light energy the multilayer body absorbed; and
optionally, the method further comprising desalting sea water, purifying sewage water, separating different solvent, or generating hot steam, by using the light energy the multilayer body absorbed.

21. A method for preparing the multilayer body of claim 13, comprising:
obtaining a liquid in which a carbon material is dispersed; and
coating or depositing said dispersion liquid on the base body, wherein said base body is water permeable,
the carbon material comprising a substance selected from the group consisting of graphite, graphite, graphene, graphene oxide, graphene modified by chemical functional groups, carbon nanotubes and combinations thereof.

* * * * *